US008636224B2

(12) United States Patent
Wang

(10) Patent No.: US 8,636,224 B2
(45) Date of Patent: Jan. 28, 2014

(54) SYSTEM AND METHOD TO AUTOMATICALLY DISCRIMINATE BETWEEN DIFFERENT DATA TYPES

(75) Inventor: Ynjiun P. Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/493,610

(22) Filed: Jun. 11, 2012

(65) Prior Publication Data

US 2012/0308091 A1 Dec. 6, 2012

Related U.S. Application Data

(60) Division of application No. 13/083,825, filed on Apr. 11, 2011, now Pat. No. 8,196,842, which is a division of application No. 12/884,946, filed on Sep. 17, 2010, now Pat. No. 7,922,088, which is a division of application No. 11/903,747, filed on Sep. 24, 2007, now abandoned, and a continuation of application No. 10/958,779, filed on Oct. 5, 2004, now Pat. No. 7,293,712.

(51) Int. Cl.
*G06K 19/06* (2006.01)

(52) U.S. Cl.
USPC ............................ 235/494; 382/123; 382/264

(58) Field of Classification Search
USPC .................... 235/462.1, 494; 382/123, 264
See application file for complete search history.

(56) References Cited

U.S. PATENT DOCUMENTS

| 3,801,775 | A | 4/1974 | Acker |
| 3,902,047 | A | 8/1975 | Tyler et al. |
| 4,020,463 | A | 4/1977 | Himmel |
| 4,286,255 | A | 8/1981 | Sly |
| 4,335,303 | A | 6/1982 | Call |
| 4,387,298 | A | 6/1983 | Petersen et al. |
| 4,499,372 | A | 2/1985 | Nakano |
| 4,530,584 | A | 7/1985 | Schmidt |
| 4,544,064 | A | 10/1985 | Felder |
| 4,562,592 | A | 12/1985 | Chainer et al. |

(Continued)

FOREIGN PATENT DOCUMENTS

| EP | 0350933 A2 | 1/1990 |
| EP | 0392159 A2 | 10/1990 |

(Continued)

OTHER PUBLICATIONS

Oct. 4, 2005 International Search Report and Written Opinion of the International Searching Authority in International Application No. PCT/US2005/035835.

(Continued)

*Primary Examiner* — Kristy A Haupt
(74) *Attorney, Agent, or Firm* — Additon, Higgins, Pendleton & Ashe, P.A.

(57) ABSTRACT

There is described a system and method for automatically discriminating between different types of data with an image reader. In brief overview of one embodiment, the automatic discrimination feature of the present image reader allows a human operator to aim a hand held image reader at a target that can contain a dataform and actuate the image reader. An autodiscrimination module in the image reader in one embodiment analyzes image data representative of the target and determines a type of data represented in the image data.

22 Claims, 12 Drawing Sheets

(56) References Cited

U.S. PATENT DOCUMENTS

| | | |
|---|---|---|
| 4,581,762 A | 4/1986 | Lapidus et al. |
| 4,588,211 A | 5/1986 | Greene |
| 4,656,591 A | 4/1987 | Goldberg |
| 4,760,248 A | 7/1988 | Swartz et al. |
| 4,776,464 A | 10/1988 | Miller et al. |
| 4,794,239 A | 12/1988 | Allais |
| 4,832,204 A | 5/1989 | Handy et al. |
| 4,835,372 A | 5/1989 | Gombrich et al. |
| 4,855,842 A | 8/1989 | Hayes et al. |
| 4,858,000 A | 8/1989 | Lu |
| 4,868,757 A | 9/1989 | Gil |
| 4,873,426 A | 10/1989 | Sarna et al. |
| 4,877,948 A | 10/1989 | Krueger |
| 4,877,949 A | 10/1989 | Danielson et al. |
| 4,924,078 A | 5/1990 | Sant'Anselmo et al. |
| 4,948,955 A | 8/1990 | Lee et al. |
| 4,972,494 A | 11/1990 | White et al. |
| 5,010,241 A | 4/1991 | Butterworth |
| 5,019,699 A | 5/1991 | Koenck |
| 5,023,438 A | 6/1991 | Wakatsuki et al. |
| 5,038,391 A | 8/1991 | Yamaguchi |
| 5,039,847 A | 8/1991 | Morii et al. |
| 5,050,223 A | 9/1991 | Sumi |
| 5,054,102 A | 10/1991 | Gaborski |
| 5,102,110 A | 4/1992 | Reynolds |
| 5,103,489 A | 4/1992 | Miette |
| 5,119,433 A | 6/1992 | Will |
| 5,120,940 A | 6/1992 | Willsie |
| 5,134,669 A | 7/1992 | Keogh et al. |
| 5,138,140 A | 8/1992 | Siemiatkowski et al. |
| 5,138,141 A | 8/1992 | Blanford et al. |
| 5,199,081 A | 3/1993 | Saito et al. |
| 5,212,777 A | 5/1993 | Gove et al. |
| 5,237,625 A | 8/1993 | Yamashita et al. |
| 5,243,655 A | 9/1993 | Wang |
| 5,262,623 A | 11/1993 | Batterman et al. |
| 5,262,871 A | 11/1993 | Wilder et al. |
| 5,278,399 A | 1/1994 | Sano |
| 5,291,243 A | 3/1994 | Heckman et al. |
| 5,296,689 A | 3/1994 | Reddersen et al. |
| 5,296,690 A | 3/1994 | Chandler et al. |
| 5,296,960 A | 3/1994 | Ellingson et al. |
| 5,299,116 A | 3/1994 | Owens et al. |
| 5,301,243 A | 4/1994 | Olschafskie et al. |
| 5,304,423 A | 4/1994 | Niknafs et al. |
| 5,304,786 A | 4/1994 | Pavlidis et al. |
| 5,307,423 A | 4/1994 | Gupta et al. |
| 5,317,388 A | 5/1994 | Surka et al. |
| 5,331,151 A | 7/1994 | Cochran et al. |
| 5,331,176 A | 7/1994 | Sant'Anselmo et al. |
| 5,337,361 A | 8/1994 | Wang et al. |
| 5,354,977 A | 10/1994 | Roustaei |
| 5,375,226 A | 12/1994 | Sano et al. |
| 5,378,883 A | 1/1995 | Batterman et al. |
| 5,392,447 A | 2/1995 | Schlack et al. |
| 5,396,054 A | 3/1995 | Krichever et al. |
| 5,399,846 A | 3/1995 | Pavlidis et al. |
| 5,410,141 A | 4/1995 | Koenck et al. |
| 5,413,383 A | 5/1995 | Laurash et al. |
| 5,414,251 A | 5/1995 | Durbin |
| 5,420,943 A | 5/1995 | Mak |
| 5,421,778 A | 6/1995 | Kouramanis |
| 5,428,211 A | 6/1995 | Zheng et al. |
| 5,428,212 A | 6/1995 | Tani et al. |
| 5,448,375 A | 9/1995 | Cooper et al. |
| 5,449,201 A | 9/1995 | Miller et al. |
| 5,467,411 A | 11/1995 | Tanaka et al. |
| 5,471,533 A | 11/1995 | Wang et al. |
| 5,489,158 A | 2/1996 | Wang et al. |
| 5,490,217 A | 2/1996 | Wang et al. |
| 5,500,516 A | 3/1996 | Durbin |
| 5,504,322 A | 4/1996 | Pavlidis et al. |
| 5,504,367 A | 4/1996 | Arackellian et al. |
| 5,506,697 A | 4/1996 | Li et al. |
| 5,508,818 A | 4/1996 | Hamma |
| 5,513,017 A | 4/1996 | Knodt et al. |
| 5,521,366 A | 5/1996 | Wang et al. |
| 5,550,364 A | 8/1996 | Rudeen |
| 5,550,366 A | 8/1996 | Roustaei |
| 5,557,091 A | 9/1996 | Krummel |
| 5,570,135 A | 10/1996 | Gove et al. |
| 5,574,519 A | 11/1996 | Manico et al. |
| 5,581,636 A | 12/1996 | Skinger |
| 5,591,955 A | 1/1997 | Laser |
| 5,591,956 A | 1/1997 | Longacre, Jr. et al. |
| 5,598,007 A | 1/1997 | Bunce et al. |
| 5,607,187 A | 3/1997 | Salive et al. |
| 5,617,481 A | 4/1997 | Nakamura |
| 5,627,915 A | 5/1997 | Rosser et al. |
| 5,635,697 A | 6/1997 | Shellhammer et al. |
| 5,642,442 A | 6/1997 | Morton et al. |
| 5,644,408 A | 7/1997 | Li et al. |
| 5,646,390 A | 7/1997 | Wang et al. |
| 5,659,167 A | 8/1997 | Wang et al. |
| 5,684,290 A | 11/1997 | Arackellian et al. |
| 5,691,527 A | 11/1997 | Hara et al. |
| 5,697,504 A | 12/1997 | Hiramatsu et al. |
| 5,702,059 A | 12/1997 | Chu et al. |
| 5,703,349 A | 12/1997 | Meyerson et al. |
| 5,710,419 A | 1/1998 | Wang et al. |
| 5,723,868 A | 3/1998 | Hammond, Jr. et al. |
| 5,726,981 A | 3/1998 | Ylitervo et al. |
| 5,734,153 A | 3/1998 | Swartz et al. |
| 5,756,981 A | 5/1998 | Roustaei et al. |
| 5,761,686 A | 6/1998 | Bloomberg |
| 5,770,841 A | 6/1998 | Moed et al. |
| 5,773,806 A | 6/1998 | Longacre, Jr. |
| 5,780,834 A | 7/1998 | Havens et al. |
| 5,783,811 A | 7/1998 | Feng et al. |
| 5,786,586 A | 7/1998 | Pidhirny et al. |
| 5,796,090 A | 8/1998 | Pavlidis et al. |
| 5,818,028 A | 10/1998 | Meyerson et al. |
| 5,818,528 A | 10/1998 | Roth et al. |
| 5,821,518 A | 10/1998 | Sussmeier et al. |
| 5,834,754 A | 11/1998 | Feng et al. |
| 5,837,986 A | 11/1998 | Barile et al. |
| 5,841,121 A | 11/1998 | Koenck |
| 5,857,029 A | 1/1999 | Patel |
| 5,867,595 A | 2/1999 | Cymbalski |
| 5,880,453 A | 3/1999 | Wang et al. |
| 5,886,338 A | 3/1999 | Arackellian et al. |
| 5,892,824 A | 4/1999 | Beatson et al. |
| 5,917,925 A | 6/1999 | Moore |
| 5,929,418 A | 7/1999 | Ehrhart et al. |
| 5,949,052 A | 9/1999 | Longacre, Jr. et al. |
| 5,949,053 A | 9/1999 | Zlotnick |
| 5,949,057 A | 9/1999 | Feng |
| 5,974,202 A | 10/1999 | Wang et al. |
| 5,992,753 A | 11/1999 | Xu |
| 6,000,612 A | 12/1999 | Xu |
| 6,002,491 A | 12/1999 | Li et al. |
| 6,011,873 A | 1/2000 | Desai et al. |
| 6,019,286 A | 2/2000 | Li et al. |
| 6,055,552 A | 4/2000 | Curry |
| 6,060,722 A | 5/2000 | Havens et al. |
| 6,062,475 A | 5/2000 | Feng |
| 6,076,731 A | 6/2000 | Terrell |
| 6,076,738 A | 6/2000 | Bloomberg et al. |
| 6,094,509 A | 7/2000 | Zheng et al. |
| 6,095,418 A | 8/2000 | Swartz et al. |
| 6,098,887 A | 8/2000 | Figarella et al. |
| 6,105,871 A | 8/2000 | Campo et al. |
| 6,115,513 A | 9/2000 | Miyazaki et al. |
| 6,122,410 A | 9/2000 | Zheng et al. |
| 6,123,261 A | 9/2000 | Roustaei |
| 6,129,278 A | 10/2000 | Wang et al. |
| 6,129,279 A | 10/2000 | Colley et al. |
| 6,149,063 A | 11/2000 | Reynolds et al. |
| 6,195,122 B1 | 2/2001 | Vincent |
| 6,212,504 B1 | 4/2001 | Hayosh |
| 6,223,988 B1 | 5/2001 | Batterman et al. |
| 6,285,916 B1 | 9/2001 | Kadaba et al. |
| 6,290,132 B1 | 9/2001 | Dickson et al. |
| 6,298,175 B1 | 10/2001 | Longacre, Jr. et al. |

(56) References Cited

U.S. PATENT DOCUMENTS

| | | | |
|---|---|---|---|
| 6,298,176 | B2 | 10/2001 | Longacre, Jr. et al. |
| 6,330,975 | B1 | 12/2001 | Bunte et al. |
| 6,340,114 | B1 | 1/2002 | Correa et al. |
| 6,347,163 | B2 | 2/2002 | Roustaei |
| 6,398,112 | B1 | 6/2002 | Li et al. |
| 6,494,375 | B1 | 12/2002 | Ishibashi et al. |
| 6,512,218 | B1 | 1/2003 | Canini et al. |
| 6,561,428 | B2 | 5/2003 | Meier et al. |
| 6,703,633 | B2 | 3/2004 | Tullis |
| 6,722,569 | B2 | 4/2004 | Ehrhart et al. |
| 6,766,053 | B2 | 7/2004 | Fan et al. |
| 6,834,807 | B2 | 12/2004 | Ehrhart et al. |
| 6,899,273 | B2 | 5/2005 | Hussey et al. |
| 7,068,821 | B2 | 6/2006 | Matsutani |
| 7,287,697 | B2 | 10/2007 | Ehrhart et al. |
| 7,293,712 | B2 | 11/2007 | Wang |
| 7,922,088 | B2 | 4/2011 | Wang |
| 2001/0055422 | A1 | 12/2001 | Roustaei |
| 2002/0039099 | A1 | 4/2002 | Harper |
| 2002/0110283 | A1 | 8/2002 | Fan et al. |
| 2002/0128796 | A1* | 9/2002 | Matsutani ............... 702/155 |
| 2002/0179717 | A1* | 12/2002 | Cummings et al. ...... 235/462.25 |
| 2003/0006290 | A1 | 1/2003 | Hussey et al. |
| 2003/0034463 | A1 | 2/2003 | Tullis |
| 2003/0062419 | A1* | 4/2003 | Ehrhart et al. ............. 235/469 |
| 2003/0089775 | A1 | 5/2003 | Yeakley et al. |
| 2003/0102376 | A1 | 6/2003 | Meier et al. |
| 2003/0127519 | A1 | 7/2003 | Ehrhart et al. |
| 2003/0222148 | A1 | 12/2003 | Schmidt et al. |
| 2004/0155110 | A1 | 8/2004 | Ehrhart et al. |
| 2004/0263911 | A1* | 12/2004 | Rodriguez et al. .......... 358/3.28 |
| 2009/0108072 | A1 | 4/2009 | Wang |

FOREIGN PATENT DOCUMENTS

| | | |
|---|---|---|
| EP | 0439682 A2 | 8/1991 |
| EP | 0733991 A1 | 9/1996 |
| EP | 0910032 A2 | 4/1999 |
| EP | 0999514 A1 | 5/2000 |
| EP | 1803079 A1 | 7/2007 |
| JP | 63311474 A | 12/1988 |
| JP | 1216486 A | 8/1989 |
| JP | 03020058 A | 1/1991 |
| JP | 4257844 A | 9/1992 |
| JP | 6250775 A | 9/1994 |
| WO | 9202371 A1 | 2/1992 |
| WO | 9217861 A1 | 10/1992 |
| WO | 9513196 A1 | 5/1995 |
| WO | 9524278 A1 | 9/1995 |
| WO | 9534043 A1 | 12/1995 |
| WO | 9639676 A1 | 12/1996 |
| WO | 9708647 A1 | 3/1997 |
| WO | 9950736 A1 | 10/1999 |
| WO | 0072246 A1 | 11/2000 |
| WO | 0122358 A1 | 3/2001 |
| WO | 02080520 A2 | 10/2002 |
| WO | 2006041923 A1 | 4/2006 |

OTHER PUBLICATIONS

Apr. 19, 2007 Notification Concerning Transmittal of International Preliminary Report on Patentability (Chapter 1 of the Patent Cooperation Treaty) in International Application No. PCT/US2005/035835, 8 pages.

* cited by examiner

SYSTEM AND METHOD TO AUTOMATICALLY DISCRIMINATE BETWEEN DIFFERENT DATA TYPES

CROSS REFERENCE TO RELATED APPLICATIONS

This application is a divisional of U.S. patent application Ser. No. 13/083,825 filed Apr. 11, 2011 entitled "System and Method to Automatically Discriminate Between Different Data Types" which is a divisional of U.S. patent application Ser. No. 12/884,946 filed Sep. 17, 2010 entitled "System and Method to Automatically Discriminate Between Different Data Types" (now U.S. Pat. No. 7,922,088) which is a divisional of U.S. patent application Ser. No. 11/903,747 filed Sep. 24, 2007 entitled "System and Method to Automatically Discriminate Between a Signature and a Bar Code" (now abandoned) which is a continuation of U.S. patent application Ser. No. 10/958,779 filed Oct. 5, 2004 entitled, "System And Method To Automatically Discriminate Between A Signature And A Dataform" (now U.S. Pat. No. 7,293,712). The above applications (U.S. patent application Ser. Nos. 13/083,825, 12/884,946, 11/903,747, and 10/958,779) are incorporated herein by reference in their entirety.

FIELD OF THE INVENTION

The invention relates to data collection in general and particularly to a system and method for automatically discriminating between different data types.

BACKGROUND OF THE INVENTION

Some currently available data collection devices, such as hand-held image readers, are capable of capturing signatures as well as reading barcodes. The reading and decoding of a barcode represents an operation distinct from that involved in capturing a signature. The reading and decoding of a bar code involves the imaging and then decoding of a one or two dimensional graphic symbol into the alphanumeric sequence encoded by the symbol. The capturing of a signature involves identifying a region of interest and then storing an electronic visual copy/representation of the identified region of interest.

One approach to enabling the operation of an image reader as a barcode decoder and a signature capture device involves the input of a human operator. According to this approach, the human operator manually switches the mode of operation of the image reader between barcode decoding and signature capturing. One disadvantage of this approach is that the manual selection process requires additional training for personnel. This additional training is in contradiction with the ideal that the operational details of an image reader should be abstracted as much as possible. For example, the human operator should be able to employ the image reader by simply pointing the device and pulling an activation trigger. Another disadvantage is that the manual selection process can be time consuming. In the field of data collection, a premium is placed on efficient quick operation and even slight delays can be significant. The significance of these delays is compounded by the large number of times the barcode read or signature capture operation is activated in an image reader during a typical session.

Another approach to enabling the operation of an image reader as a barcode decoder and a signature capture device involves using a dataform decode operation to identify and locate the signature capture area. The dataform approach suffers from several drawbacks. One drawback is that if the dataform, such as a linear barcode or two dimensional symbology, has been damaged due to handling or defected through printing, the dataform decode failure will render the signature capture inoperable. Another drawback of the dataform approach is that space constraints can make it difficult to accommodate the space required for a dataform. For example on some shipping labels and on some driver's licenses, little free space is available for additional graphic elements. A further drawback of the dataform approach is that its operation is unintuitive. Although the human operator desires to capture the signature, he or she must aim the reader at the dataform instead of the signature. The result of this unintuitive approach is that frequently the signature image will be clipped due to improper orientation of the image reader. To achieve more acceptable operation, additional human operator training and feedback, with its commensurate costs and burdens, is often required.

Hence, there is a need for an image reader that facilitates the capturing of signatures while maintaining the image reader's ease of operation as a bar code reader.

SUMMARY OF THE INVENTION

There is described a system and method for automatically discriminating between different types of data with an image reader. In brief overview of one embodiment, the automatic discrimination feature of the present image reader allows a human operator to aim a hand held image reader at a target that can contain a dataform and actuate the image reader. An autodiscrimination module in the image reader in one embodiment analyzes image data representative of the target and determines a type of data represented in the image data.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
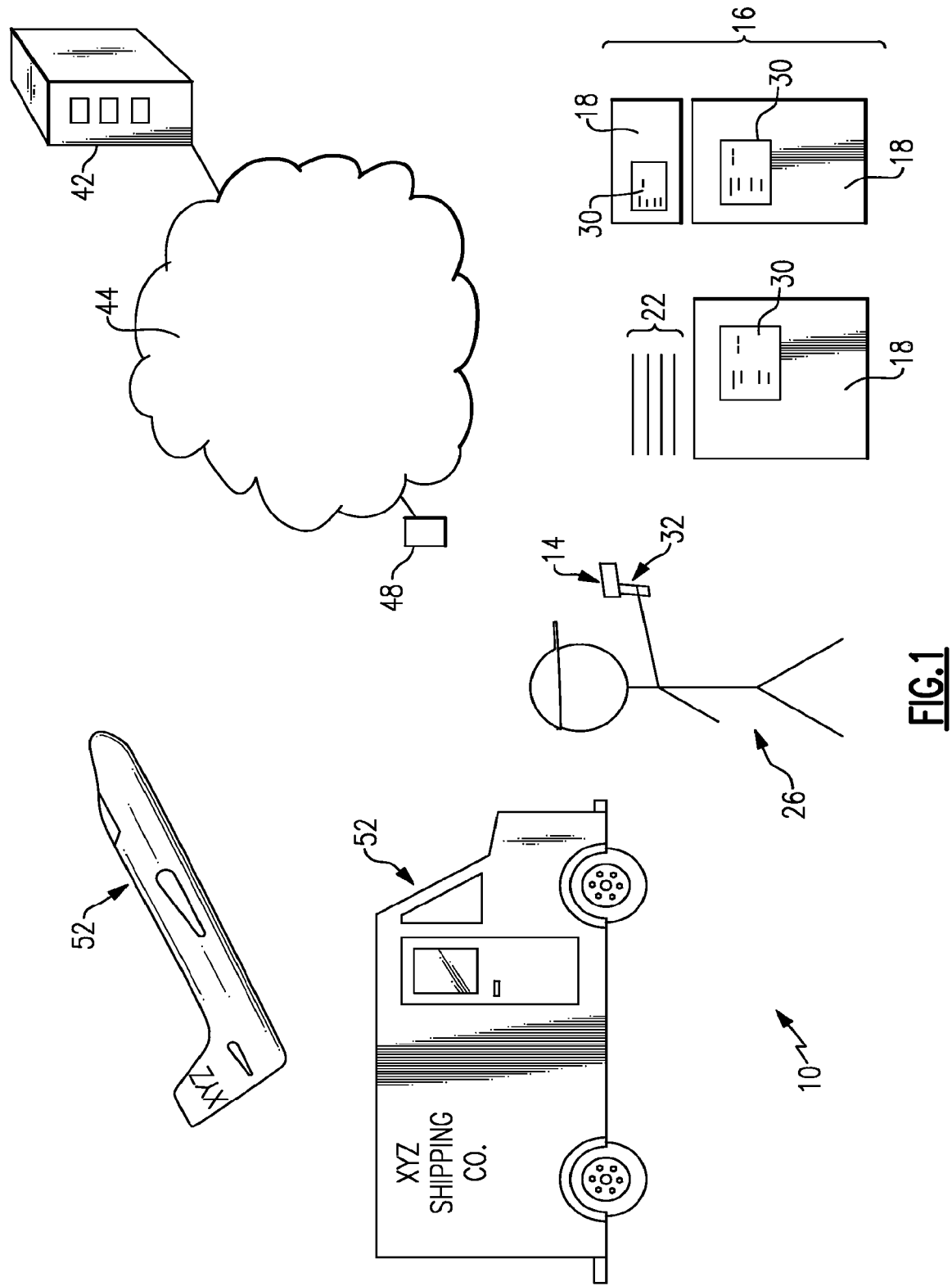
FIG. 1 shows an embodiment of an image reader constructed in accordance with the principles of the invention employed in a package shipping environment.

The invention features a system and method for automatically discriminating between different types of data, such as a barcode and a signature, with an image reader. In brief overview of one embodiment, the automatic discrimination feature of the present image reader allows a human operator to aim a hand-held image reader at a target containing a dataform, a signature, or another element and actuate the trigger on the image reader. An autodiscrimination module in the image reader analyzes image data representative of the target and determines whether the target contains a dataform, a signature, or another type of data. If the target contains a dataform, the image reader decodes the dataform and outputs decoded dataform data, such as the alphanumeric sequence encoded by a barcode. If the target contains a signature, the image reader captures a representation of the signature. For other types of data, the image reader performs a correspondingly appropriate operation such as optical character recognition (OCR) decoding for printed text. In a further embodiment, the image reader is able to automatically identify a plurality of data types. The data types that can be automatically discriminated or identified according to the invention include signatures; dataforms; handwritten text; typed text; machine readable text; OCR data; graphics; pictures; images; forms such as shipping manifests, bills of lading, ID cards, and the like; finger prints; biometrics such as facial images, retinal scans, and equivalence thereof. As used herein a dataform refers to an originally machine generated symbology that is also machine readable such as a 1-D barcode, a 2-D barcode, a 1-D stacked barcode, a logo, glyphs, color-codes, and the like.

In one embodiment, the autodiscrimination module comprises a dataform decoder module and an image processing and analysis module. The image processing and analysis module further comprises a feature extraction module and a general classifier module. The feature extraction module performs a texture analysis of the image data to generate a sequence of numeric outputs representative of the texture of the image data. Examples of the various types of texture that the image data can have are barcode texture, signature texture, hand-written text texture, printed text texture, graphics texture, picture texture, image texture, and the like. In one embodiment, the texture analysis includes testing the image data for the presence of characteristics indicative of a signature, such as the presence of curved elements. The numeric outputs of the feature extraction module are used as inputs to the general classifier module to classify the image data. In one embodiment, if the dataform decoder module has failed to successfully decode the image data and the general classifier module indicates that a signature is present, the image reader automatically stores a full or an encoded representation of the signature.

With the autodiscrimination module, an image reader of the present invention provides an intuitive straightforward and efficient system to collect image data that can have varied content including dataforms and signatures. No special signature capture forms or signature locating barcodes are required. When using one embodiment of an image reader of the present invention, a human operator intuitively points the reader directly at the data to be collected, regardless of its type, and actuates a trigger. A successful dataform decode, signature capture, or the like is indicated with a common operator feedback mechanism such as a beep tone.

Figure 2:
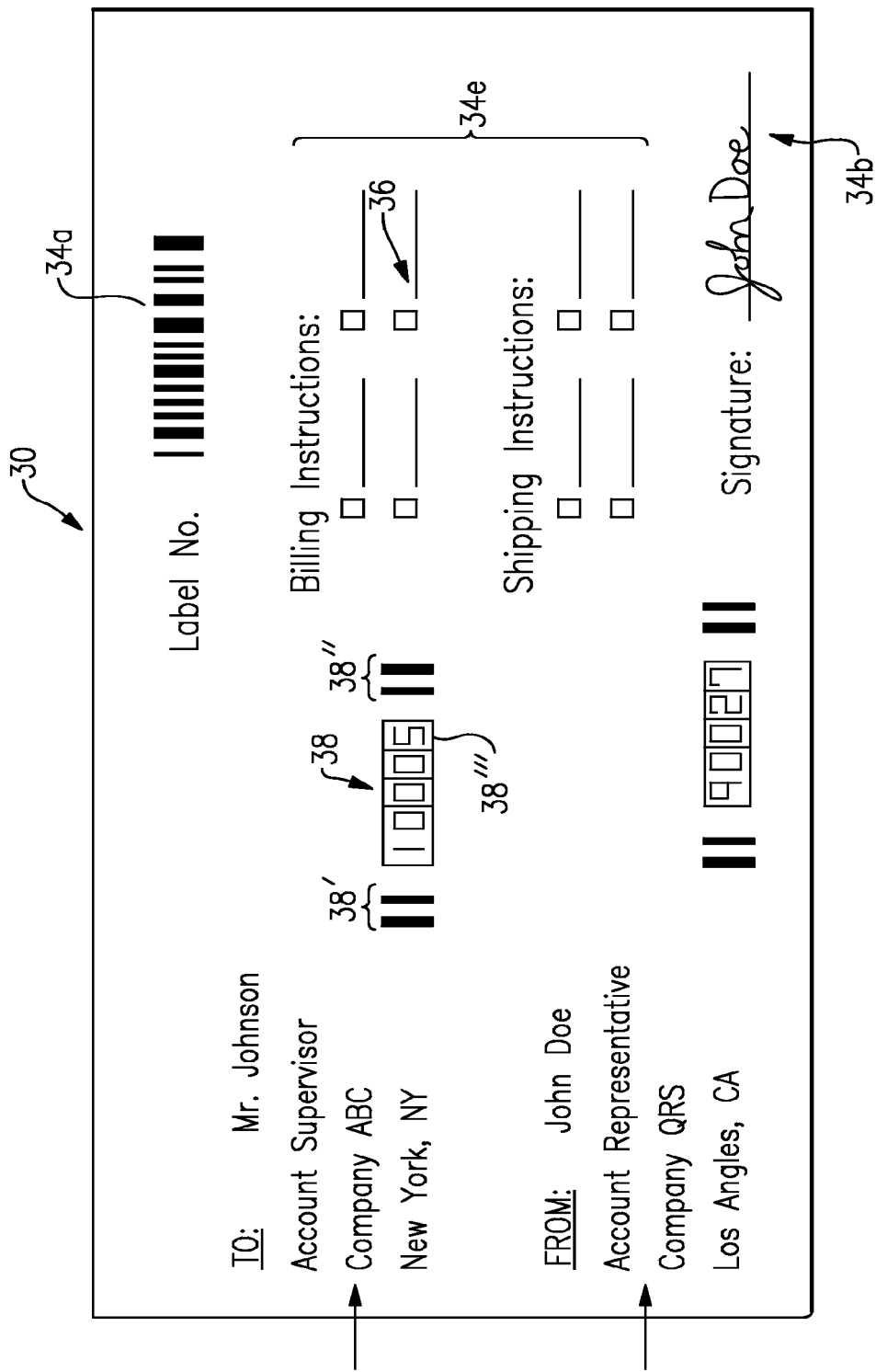
FIG. 2 shows a shipping label from the package shipping environment of FIG. 1 with a plurality of data types used in accordance with the invention.

Referring to FIG. 1, a package transport or shipping environment 10 in which an image reader 14 of the present invention is employed is shown. Carrier service providers, such as Federal Express™, United Postal Service™, the United States Postal Service™, and the like, can employ the environment shown to ship and track items. As part of logging in transport items 16, such as packages 18 and letter envelopes 22, a human operator 26, such as a shipping agent, uses the image reader 14 to image data from shipping labels 30 on the transport items 16. FIG. 2 shows details of a shipping label 30 with various types of data 34 that can automatically be collected by the image reader 14. The collection process involves the human operator actuating the same trigger 32 on the image reader 14 for any data type to be read. The data 34 shown includes a dataform 34a, such as a one-dimensional barcode encoding a label number, a signature 34b, handwritten text 34c, and typed text 34d. In some embodiments, additional elements on the label 30 can be treated as graphic elements 34e that contain information. In operation the image reader 14, identifies the nature of the imaged data and performs the appropriate action. For the dataform 34a, the image reader 14 decodes the dataform 34a and creates a shipping record based on the encoded dataform 34a alphanumeric sequence. For the signature 34b, the image reader 14 captures a representation of the signature 34b. For the handwritten text 34c, the image reader can capture an image and can possibly perform additional analysis. In one embodiment, the additional analysis includes locating and decoding the zip code 38 written by the sender. As shown, in some embodiments, locating and decoding the zip code can be aided by start 38' and stop patterns 38" and by boxes 38'" used to enclose the zip code 38 numerals. For the typed text 34d, the image reader 14 identifies the data 34d as typed text and performs OCR decoding. In one embodiment, the checked boxes 36 in the Shipping and Billing Instructions are treated as graphic elements 34e that are imaged and decoded to determine the information contained within. In another embodiment, the graphic elements 34e are simply identified as graphic elements and an image of them is captured. The decoding of label specific elements, such as in some embodiments the graphic elements 34e or the start 38', stop 38" and bounding patterns 38'", can be enhanced by specifically developed software, firmware, and/or dedicated circuits included in the image reader 14.

Once data 34 from the label 30 has been collected by the image reader 14, data can be transmitted to a package tracking system 42 via a bi-directional communications network 44. The bi-directional communications network 44 can include a wired communications system including wired (e.g., a medium such as electrical wire, Ethernet and optical fiber) connections through a switching system, such as the telephone system, or a packet based system, such as the internet. The bi-directional communications network 44 can also include a wireless communications system, such as one employing electromagnetic signals using radio or satellite transmission. In addition the bi-directional communications network 44 could comprise a system including both wired and wireless links. Communication between the image reader 14 and the bi-directional communications network 44 can occur directly or can be facilitated by, for example, a transmissions cradle 48 that has a direct wired or wireless connection with the bi-directional communications network 44. As shown, once data 34 from the transport items 16 has been collected, various transportation means 52 are used to transfer the transport items 16 as part of their shipment.

Figure 3:
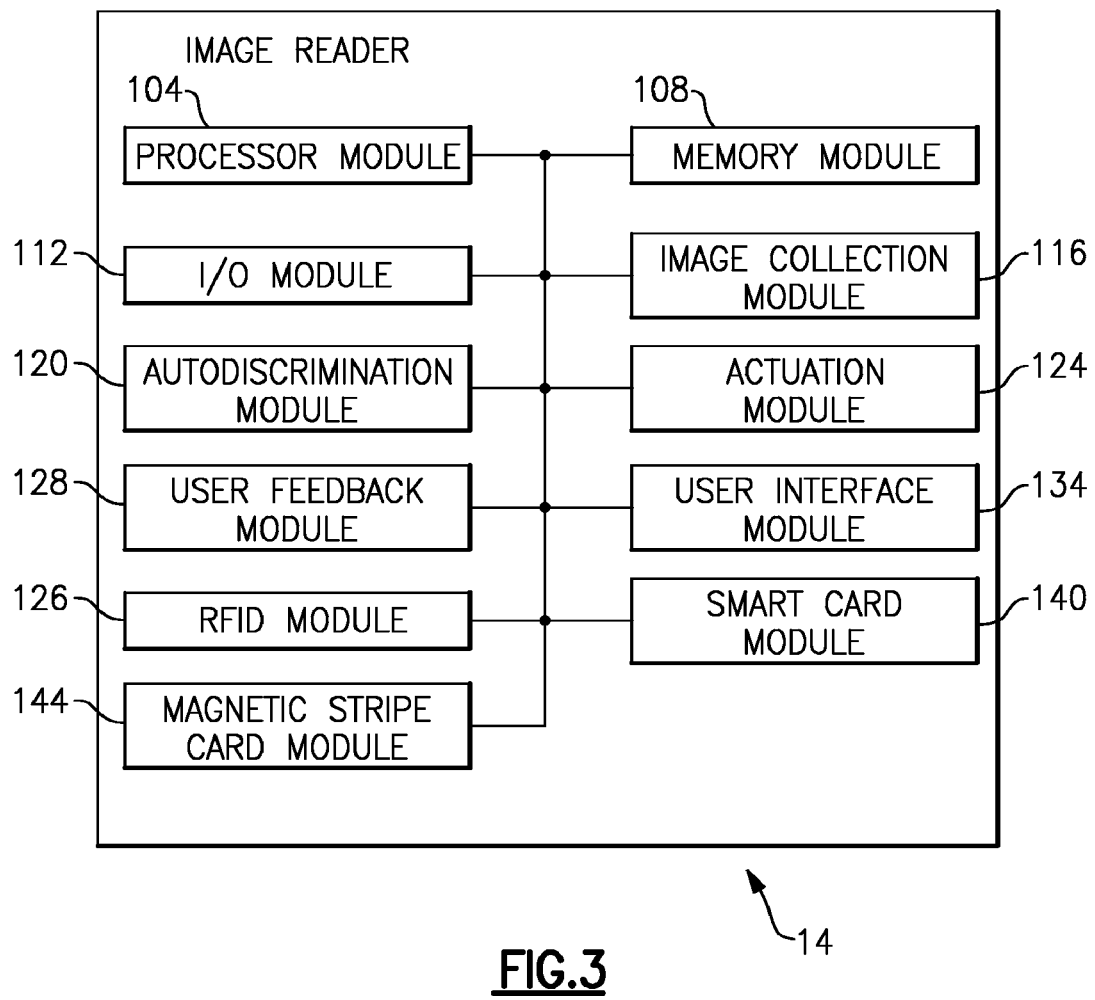
FIG. 3 is schematic block diagram of an image reader constructed in accordance with the principles of the invention.

In FIG. 3 is shown a schematic block diagram of the image reader 14 according to one embodiment of the invention. The image reader 14 can include one or more of: a processor module 104, a memory module 108, an I/O module 112, an image collection module 116, an automatic discrimination module 120, an actuation module 124, a user feedback module 128, display module 132, a user interface module 134, a radio frequency identification (RFID) module 136, a smart card module 140, and/or a magnetic stripe card module 144. In a various embodiments each of the modules is in combination with one or more of the other modules.

Figure 4:
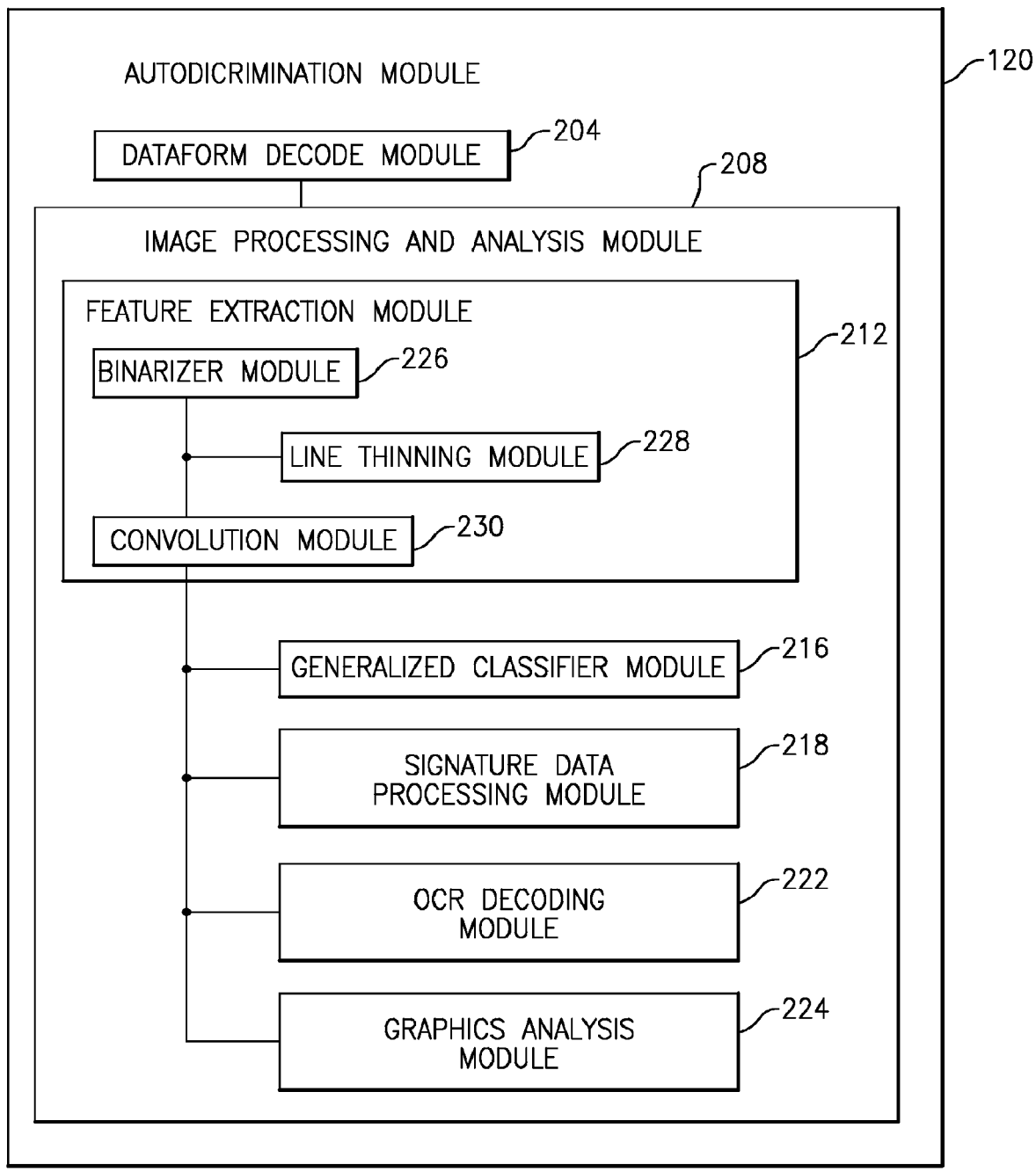
FIG. 4 is a schematic block diagram showing details of the image reader of FIG. 3.

FIG. 4 shows one embodiment of the autodiscrimination module 120 that comprises a dataform decode module 204 and an image processing and analysis module 208 that are in communication with each other. As shown in this embodiment, the image processing and analysis module 208 comprises a feature extraction module 212, a generalized classifier module 216, a signature data processing module 218, an OCR decode module 222, and a graphics analysis module 224 that are in communication with each other. In addition as shown in FIG. 4, the feature extraction module 212 comprises a binarizer module 226, a line thinning module 228, and a convolution module 230 that are in communication with each other.

Figure 5:
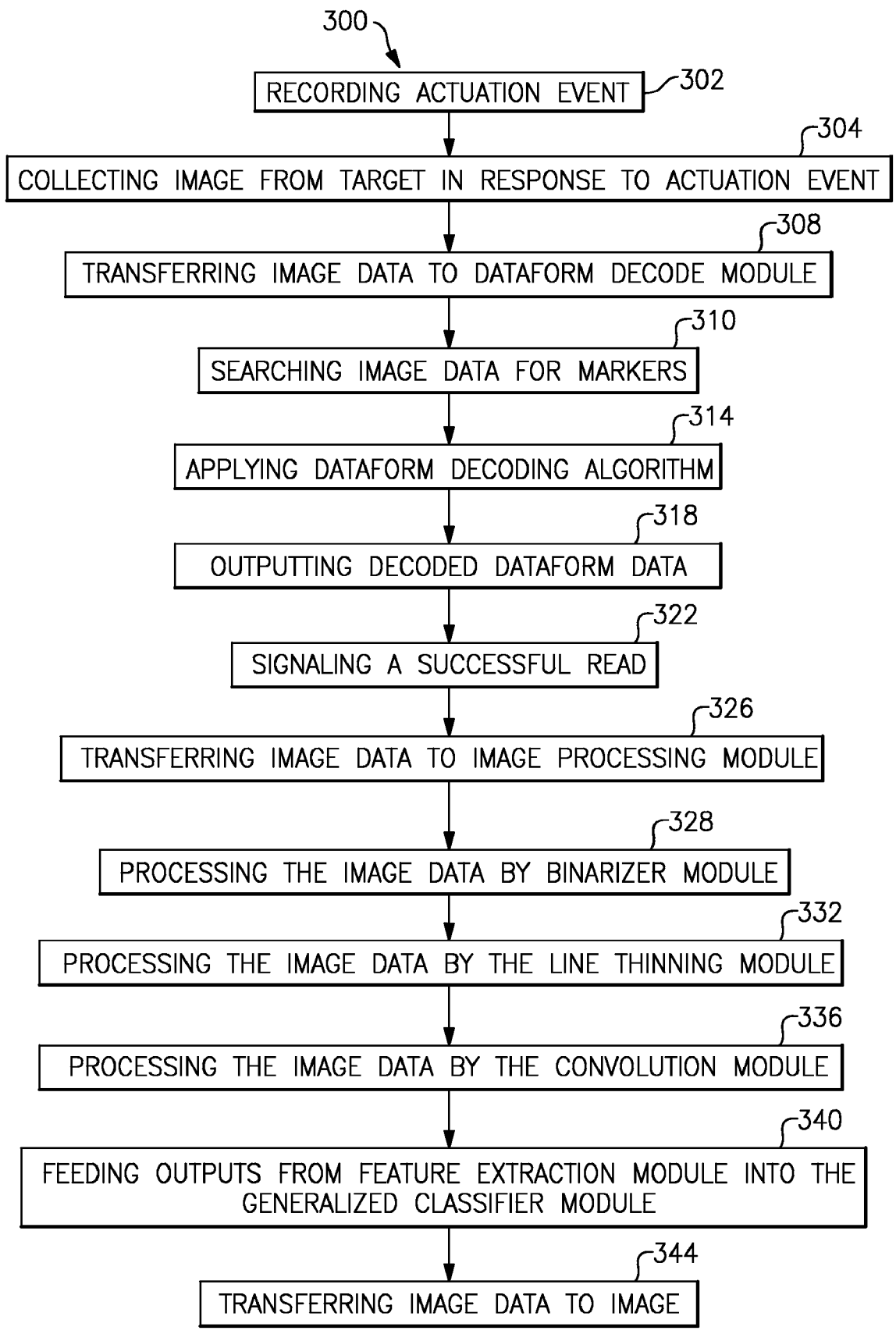
FIG. 5 shows a process for practicing the principles of the invention including automatically discriminating between different data types.

FIG. 5 shows a process 300 for employing one embodiment of the invention utilizing the autodiscrimination module shown in FIG. 4. The process 300 comprises an image reader recording an actuation event (step 302), such as a trigger pull, and in response collecting (step 304) image data from a target with the image reader 14. After collection, the image data is transferred (step 308) to the dataform decode module 204. The dataform decode module searches (step 310) the image data for markers, such as a quiet zone, indicative of the presence of a dataform, such as a one or two dimensional barcode. If a potential dataform is located, the dataform decode module 204 applies (step 314) one or more dataform decoding algorithms to the ensuing image data. If the decode attempt is successful, the image reader 14 outputs (step 318) decoded dataform data and signals (step 322) a successful read with an alert, such as a beep tone.

In one embodiment if the decode attempt is not successful, the image data is transferred (step 326) to the image processing and analysis module 208. In another embodiment, the image data is processed in parallel with the attempt to decode the dataform data. In one such embodiment, the process that completes first (i.e., dataform decode attempt or the image processing) outputs its data (e.g., a decoded barcode or a captured signature) and the other parallel process is terminated. In a further embodiment, the image data is processed in response to the decoding of the dataform. In one such embodiment, a barcode encodes item information such as shipping label number and information indicating that a signature should be captured.

Within the image processing and analysis module 208, the image data is processed by the feature extraction module 212. In general, the feature extraction module generates numeric outputs that are indicative of the texture of the image data. As indicated above, the texture of the image data refers to the characteristics of the type of data contained in the image data. Common types of texture include one or two dimensional barcode texture, signature texture, graphics texture, typed text texture, hand-written text texture, drawing or image texture, photograph texture, and the like. Within any category of textures, sub-categories of texture are sometime capable of being identified.

As part of the processing of the image data by the feature extraction module 212, the image data is processed (step 328) by the binarizer module 226. The binarizer module 226 binarizes the grey level image into a binary image according to the local thresholding and target image size normalization. With the image data binarized, the image data is processed (step 332) by the line thinning module 228 to reduce multi-pixel thick line segments into single pixel thick lines. With binarized line thinned image data, the image data is processed (step 336) by the convolution module 230.

Figure 6A:
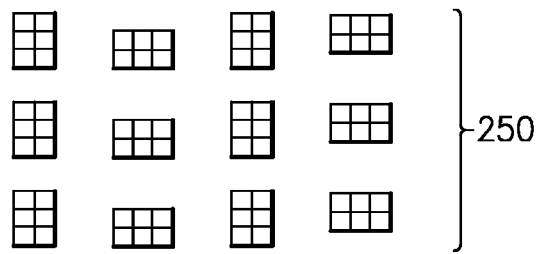
FIG. 6A shows one embodiment of a plurality of curvelet detector maps constructed in accordance with the principles of the invention.

In general the convolution module 230 convolves the processed image data with one or more detector maps designed according to the invention to identify various textural features in the image data. In one embodiment, the convolution module 230 generates a pair of numbers, the mean and variance (or standard deviation), for each convolved detector map. FIG. 6A shows a set of 12 2×3 binary curvelet detector maps 250 used to detect curved elements present in image data. As each of the curvelet detector maps 250 is convolved with the image data, the mean value and the variance generated provide an indication of the presence or density of elements in the binarized line thinned image data having similar shapes to the curvelet detector maps 250. As each pixel map generates a pair of numbers, the 12 curvelet detector maps 250 generate a total of 24 numbers. According to one embodiment, these 24 numbers are representative of the curved or signature texture of the processed image data.

Further processing of the image data includes the outputs from the feature extraction module 212 being fed (step 340) into the generalized classified module 216. The generalized classifier module 216 uses the numbers generated by the feature extraction module as inputs to a neural network, a mean square error classifier or the like. These tools are used to classify the image data into general categories. In embodiments employing neural networks, different neural network configurations are contemplated in accordance with the invention to achieve different operational optimizations and characteristics. In one embodiment employing a neural network, the generalized classifier module 212 includes a 24+12+6+1=43 nodes Feedforward, Back Propagation Multilayer neural network. The input layer has 24 nodes for the 12 pairs of mean and variance outputs generated by a convolution module 230 employing the 12 curvelet detector maps 250. In the neural network of this embodiment, there are two hidden layers of 12 nodes and 6 nodes respectively. There is also one output node to report the positive or negative existence of a signature.

Figure 6B:
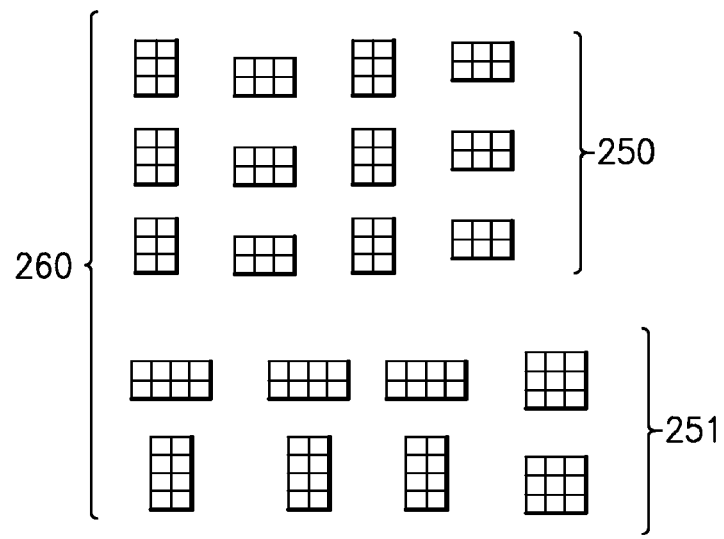
FIG. 6B shows another embodiment of a plurality of curvelet detector maps constructed in accordance with the principles of the invention.

In another embodiment employing a neural network, the 20 curvelet detector maps 260 shown in FIG. 6B are used by the convolution module 230. As shown, the 20 curvelet detector maps 260 include the original 12 curvelet detector maps 250 of FIG. 6A. The additional 8 pixel maps 260' are used to provide orientation information regarding the signature. In one embodiment employing the 20 curvelet detector maps 260, the generalized classifier module 216 is a 40+40+20+9=109 nodes Feedforward, Back Propagation Multiplayer neural network. The input layer has 40 nodes for the 20 pairs of mean and variance outputs generated by a convolution module 230 employing the 20 curvelet detector maps 260. In the neural network of this embodiment, there are two hidden layers of 40 nodes and 20 nodes respectively, one output node to report the positive or negative existence of a signature, and 8 output nodes to report the degree of orientation of the signature. The eight output nodes provide $2^8$=256 possible orientation states. Therefore, the orientation angle is given in degrees between 0 and 360 in increments of 1.4 degrees.

In some embodiments, the generalized classifier module 216 is capable of classifying data into an expanded collection of categories. For example in some embodiments, the generalized classifier module 216 specifies whether the image data contains various data types such as a signature; a dataform; handwritten text; typed text; machine readable text; OCR data; graphics; pictures; images; forms such as shipping manifest, bill of lading, ID cards, and the like; fingerprints, biometrics such as fingerprints, facial images, retinal scans and the like, and/or other types of identifiers. In further additional embodiments, the generalized classifier module 216 specifies whether the image data includes various combinations of these data types. In some embodiments, the general classifier module 216 specifies whether the image data contains a specified type of data or not. In one such embodiment, the image processing and analysis module 208 is contained within an identification module that outputs an affirmative or negative response depending on the presence or absence of the specified data type, such as a signature or a biometric, in the image data.

Figure 7:
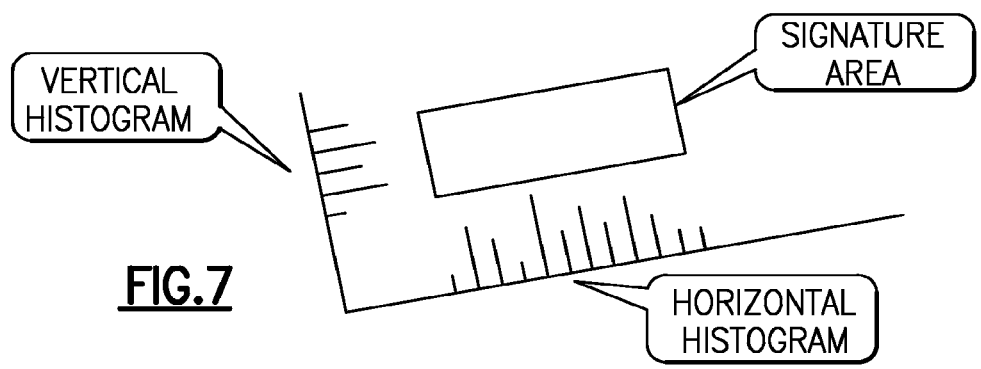
FIG. 7 is a diagrammatic representation of a histogram analysis performed in one embodiment of the invention.

In one embodiment once the presence of a signature has been confirmed and its general orientation determined, image data is transferred (step 344) to the signature data processing module 218. In one embodiment, the signature data processing module 218 is used to detect the boundaries of the signature in the image data. In one embodiment, the signature boundary is detected using a histogram analysis. As shown in FIG. 7, a histogram analysis consists of a series of one-dimensional slices along horizontal and vertical directions defined relative to the orientation of the signature. In one embodiment, the value for each one-dimensional slice corresponds to the number of black (i.e., zero valued) pixels along that pixel slice. In some embodiments if no barcodes have been decoded, then some specified region of the full frame of image data, such as a central region is captured for signature analysis. Once completed, the histogram analysis provides a two-dimensional plot of the density of data element pixels in the image data. The boundary of the signature is determined with respect to a minimum density that must be achieved for a certain number of sequential slices. In one embodiment, the histogram analysis searches inwardly along both horizontal and vertical directions until the pixel density rises above a predefined cut-off threshold. So that the signature data is not inadvertently cropped, it is common to use low cut-off threshold values.

In one embodiment, once the boundaries of the signature have been determined, the signature data processing module 218 crops the image data and extracts the signature image data. In one such embodiment, the cropping is performed by an image modification module that generates modified image data in which a portion of the image data not including the signature has been deleted. In other embodiments, various compression techniques are employed to reduce the memory requirements for the signature image data. One such technique includes the encoding of the signature image data by run length encoding. According to this technique, the length of each run of similar binarized values (i.e., the length of each run of 1 or 0) for each scan line is recorded as a means of reconstructing a bit map. Another encoding technique treats the signature image data as a data structure where the elements of the data structure consist of vectors. According this encoding technique, the signature is broken down into a collection of vectors. The position of each vector in combination with the length and orientation of each vector is used to reconstruct the original signature. In one such embodiment, the encoding process generates a new vector whenever the curvature for a continuous pixel run exceeds a specified value. A further compression technique employs B-Spline curve fitting. This technique has the capacity to robustly accommodate curvature and scaling issues.

In various embodiments, the signature image data or a compressed or encoded version of the signature image data is stored locally on a dedicated memory device. In one such embodiment, the local memory device can be detachable memory device such as a CompactFlash memory card or the like described in more detail below. In another embodiment, the signature image data is stored in a volatile or non-volatile portion of general purpose memory and downloaded at a future time. In a further embodiment, the signature image data can be transmitted via wired or wireless means either at the time of capture or at a later point, such as when a data collection session has been completed. One example of the completion of a data collection session that results in the transmission of data is when a shipping agent returns to his or her vehicle with items that have been recently logged. Once in the vehicle the shipping agent places the image reader 14 in a transmission cradle 48 that transfers the data to the package tracking system 42 via, for example, a GSM/GPRS communications link.

In another embodiment, the signature data processing module 218 does not perform a histogram analysis but simply stores in memory the entire image or a compressed version once the presence of a signature has been determined. In a further embodiment to save processing time, the initial image analysis is performed on a lower resolution image. Once the presence of a signature is determined in this embodiment, a higher resolution image is taken. In one embodiment, a signature extraction histogram analysis is performed on this image. Next, the image is stored in memory in either compressed or original format. In some embodiments, the image data is combined with other data to form a record for a particular item such as a package 18 or shipping envelope 22. As mentioned above, some of the additional data that can be collected by the image reader 14 and stored with or separate from the signature data includes but is not limited to dataform data, handwritten text data, typed text data, graphics data, image or picture data, and the like.

As part of its operations, the image processing and analysis module 208 can be designed to perform specialized tasks for different data types. For example, if the generalized classifier module 216 determines that the image data contains typed or machine readable text, the image data can be collected, possibly histogram analyzed, and stored or alternatively the image data can be transferred to the OCR decoding module 222. Similarly, if the generalized classifier module 216 determines that the image data includes a graphic element, the image data can be transferred to the graphics analysis module 224 for processing. In one embodiment, the graphics analysis module 224 is configured to recognize and decode predefined graphics. In one such embodiment as discussed above, the graphics analysis can include determining which, if any, boxes have been selected in the billing and shipping instructions 34e on a shipping label 30. In a further embodiment, the graphics analysis can include locating and decoding the typed or handwritten text contained in the zip code box 38 on a shipping label 30. In an alternative embodiment, the image reader 14 can be configured to automatically attempt decode operations in addition to the dataform decode, such as OCR decoding or graphics decoding, prior to the activation of the feature extraction module 212.

Figure 8A:
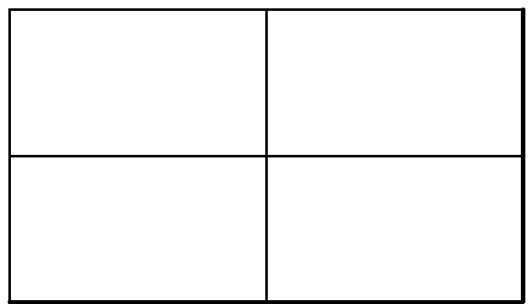
FIGS. 8A-8D are diagrammatic representations of an image data segmentation processes according to embodiments of the invention.
Figure 8B:
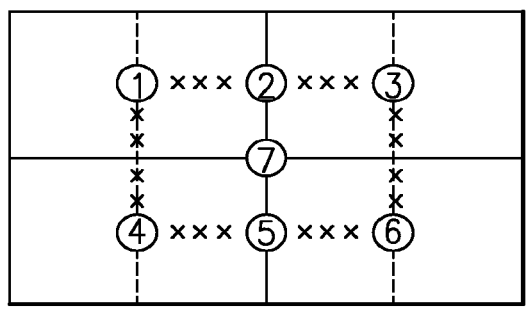
Figure 8C:
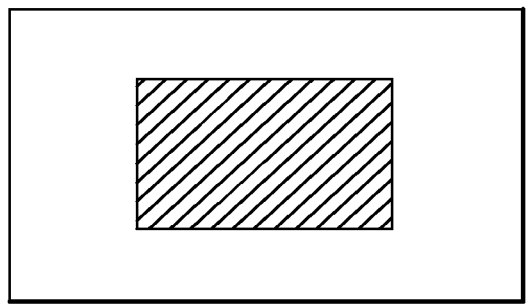
Figure 8D:
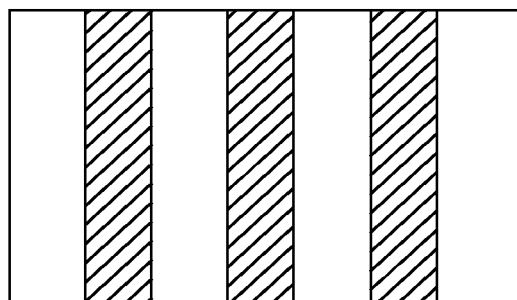

In another embodiment, the image processing and analysis module 208 segments the image data into regions and performs a feature extraction and general classification analysis on each region. In one embodiment as shown in FIG. 8A, the standard rectangular image data window is divided into four equal sized sub-rectangles. In another embodiment shown in FIG. 8B, the segmentation consists of overlapping regions so that the total area of the segmented regions is larger than that of the complete field of the image data. In FIG. 8B there are seven shown overlapping regions where each identifying numeral is shown in the center of its region. In a further embodiment shown in FIGS. 8C and 8D, the segmentation consists of sample regions (shown as cross-hatched) within the complete field of the image data. In another embodiment, the sampled regions can be based on a preloaded user template that, for example, identifies regions of interest such as a signature region and/or a barcode region, in for example, a shipping label.

In one embodiment, the segmentation process is used to identify the location of a signature in image data the might include additional elements such as dataforms, text, graphics, images and the like. In one such embodiment the generalized classifier module 216 classifies the contents of each region of the segmented image data. The region containing the signature is then extracted by the signature data processing module 218. In one embodiment if multiple regions are indicated as containing signature data, the signature data processing module 218 analyzes the arrangement of these regions to identify the region most likely to contain the image data. In a further embodiment when multiple regions are indicated as containing signature data, the image processing and analysis module establishes a feedback loop where additional segmented regions are generated and analyzed until a single segmented region containing signature data is located.

In an additional embodiment in which an image to be collected contains a varied combination of data types, the classification of the segmented regions is used to initiate appropriate processing for each region. For example, for a region containing signature data, the signature is captured; for a region containing typed or machine readable text, an OCR analysis is performed; for graphic elements, a graphics analysis is performed; and the like.

Figure 9:
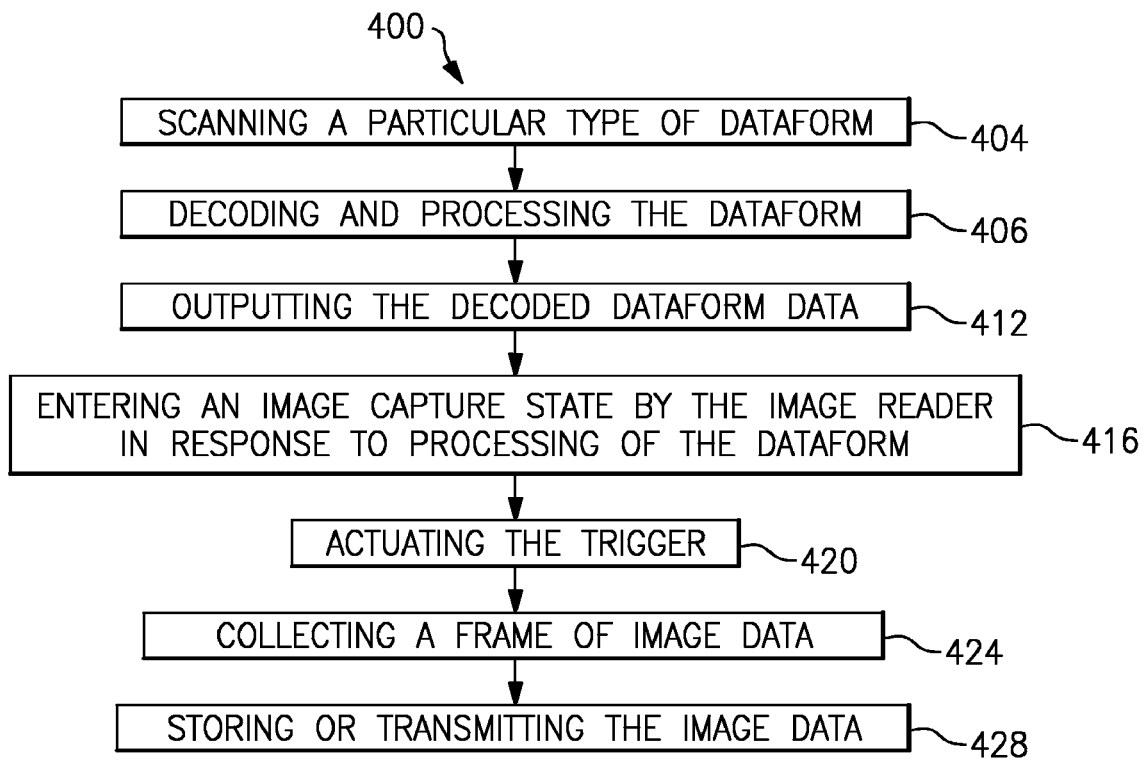
FIG. 9 shows a process for practicing the principles of the invention including reading and decoding a dataform and capturing a signature.

In some embodiments, a predefined order or sequence of operations involving the image reader 14 is known to occur. In these embodiments, the predefined order can be used to increase the efficiency of the operation of the image reader 14 and the data collection processes. An example of such an embodiment is a situation where a signature capture occurs subsequent to the reading and decoding of a certain type of dataform. A process 400 of one such embodiment is shown in FIG. 9. The process 400 includes the operator scanning (step 404) a particular type of dataform. The image reader 14 then decodes and processes (step 408) the dataform and outputs (step 412) decoded dataform data. In response to the processing of the particular type of dataform, the image reader enters (step 416) an image capture state. In this state when the operator next actuates the trigger (step 420), the image reader 14 collects (step 424) a frame of image data and either stores or transmits (step 428) the image data. One example of such an embodiment is a process that can be employed by the shipping agent described above. In this example, the shipping agent first scans the shipping label barcode 34a. In response to the decoding of this barcode 34a, the image reader 14 enters a signature capture mode. Next, the shipping agent, knowing that the image reader 14 is prepared to capture a signature, aims the image reader 14 at the signature 34b and pulls the trigger 32. The image reader 14 then collects an image of the signature and either stores the image or transmits the image to the package tracking system 42. In this embodiment, the capture of the signature can occur more quickly because the image reader 14 does not process the image data with the dataform decode module 204 or the image processing and analysis module 208.

An additional example of an environment in which the image reader 14 can be employed is in pharmacy to facilitate the filling of a prescription. Frequently regulations now require that a person receiving a prescription must sign for the prescription. A copy of the signature must be collected and provided to regulators to ensure that the person collecting the prescription is the person authorized to do so. According to one embodiment used in this environment, an optional first step is that the image reader 14 can be used to collect an image of the prescription provided by a hospital or a doctor. The prescription can be handwritten, typed, or encoded by a barcode. If the prescription is typed or encoded in a barcode, the image reader 14 can decode the information contained therein for record keeping and for presentation to the pharmacist. Once the pharmacist has filled the prescription, a label for the prescription container is printed. Frequently the prescription label includes barcode encoding information regarding the prescription such as one or more of the date it was filled, the type of medicine, the patient's name, the patient's medical condition, the patent's insurance provider or Medicare number, and the like. To prove receipt of the medicine by the proper party, the patient signs the label. As the label is attached to the prescription, previously a photocopy or a carbon copy of the label with the signature was necessary for verification purposes for the pharmacy. With the current invention, the information in the label can be captured in a quick and efficient manner with the image reader 14. The pharmacist can scan the barcode on the label to create a record and then scan the signature as proof of distribution in accordance with regulations. As described above in one embodiment, the pharmacist takes one image of the label including the barcode and the signature. The image reader 14 then automatically locates and appropriately processes the barcode, the signature, and any additional required data.

Further examples of situations in which the image reader 14 can be employed include commercial transactions in which a copy of a signed receipt is required. For example if a customer has paid for a meal at a restaurant or purchased goods or services at a retail establishment or supermarket, frequently he or she will be required to sign a receipt. The business establishment usually retains a copy of the signature as proof of payment for their records. Using the image reader 14, however, the employee receiving the signed receipt can easily and efficiently capture the signature as an electronic record. This allows for the immediate disposal of the receipt thereby simplifying record keeping and transaction processing operations.

Referring again to FIG. 3, the following description provides additional details on modules in the image reader 14 presented above. In various embodiments, the processor module 104 can include PCBs, standard and proprietary electrical components, and generic and function specific integrated circuits such as microprocessors and application specific integrated circuit (ASIC). The memory module 108 can comprise any one or more of read-only (ROM), random access (RAM) and non-volatile programmable memory for data storage. The ROM-based memory can be used to accommodate security data and image reader 14 operating system instructions and code for other modules. The RAM-based memory can be used to facilitate temporary data storage during image reader operation. Non-volatile programmable memory may take various forms, erasable programmable ROM (EPROM) and electrically erasable programmable ROM (EEPROM) being typical. In some embodiments, non-volatile memory is used to ensure that the data is retained when the image reader 14 is in its quiescent or power-saving "sleep" state.

The image collection module 116 can be designed to collect optical, infrared, or ultraviolet electromagnetic signals, depending on the composition of lenses and materials of construction of the imaging sensor thereof. For example, a silicon sensor operating with common plastic or glass lenses can detect signals in the visible region of the electromagnetic spectrum. A gallium arsenide or other III-V compound semiconductor sensor operating with quartz optics can detect signals in the ultraviolet. Infrared sensors, such as the IMD series of pyroelectric infrared sensors available from Murata Manufacturing Company, Ltd., of Tokyo, Japan, can be used to detect the presence of infrared signals.

In embodiments where the image collection module 116 is an electronic camera or a CCD or CMOS array, the signals obtained from the optical imaging device can be decoded with a suitably programmed computer or microprocessor, and can represent many different kinds of information, as described below in more detail. In one embodiment, the image collection module 116 is any one of the IMAGETEAM™ linear or area (2D) imaging engines, such as the 4000 OEM 2D Image Engine, available from Hand Held Products, Inc.

The I/O module 112 is used to establish potentially bi-directional communications between the image reader 14 and other electronic devices. Examples of elements that can comprise a portion of the I/O module 112 include a wireless or wired Ethernet interface, a dial-up or cable modem interface, a USB interface, a PCMCIA interface, a RS232 interface, an IBM Tailgate Interface RS485 interface, a PS/2 keyboard/mouse port, a specialized audio and/or video interface, a CompactFlash interface, a PC Card Standard interface, a Secure Digital standard for memory, a Secure Digital Input Output for input/output devices and/or any other standard or proprietary device interface. A CompactFlash interface is an interface designed in accordance with the CompactFlash standard as described in the CompactFlash Specification version 2.0 maintained at the website http://www.compactflash.org. The CompactFlash Specification version 2.0 document is herein incorporated by reference in its entirety. A PC Card Standard interface is an interface designed in accordance with the PC Card Standard as described by, for example, the PC Card Standard 8.0 Release—April 2001 maintained by the Personal Computer Memory Card International Association (PCMCIA) and available through the website at http://www.pcmcia.org. The PC Card Standard 8.0 Release—April 2001 Specification version 2.0 document is herein incorporated by reference in its entirety.

The actuation module 124 is used to initiate the operation of various aspects of the image reader 14 such as data collection and processing. In a hand-held embodiment of the image reader 14, the actuation module comprises a finger actuatable trigger 32. In a fixed mounted embodiment of the image reader 14, the actuation module 124 comprises an object sensing module that initiates the operation of the image reader 14 when the presence of an object to be imaged is detected.

The user feedback module 128 is used to provide some form of sensory feedback to an operator. In various embodiments, the feedback can include an auditory signal such as a beep alert or tone, a visual display such as a flashing indicator, a mechanical sensation such a vibration in the image reader 14, or any other sensory feedback capable of indicating to an operator the status of operation of the image reader 14 such as a successful image capture.

The display module 132 is used to provide display information such as operational status such as battery or memory capacity, mode of operation, or other information to an operator. In various embodiments the display module 132 can be provided by a LCD flat panel display with an optional touch-pad screen overlay for receiving operator tactile input coordinated with the display.

The user interface module 134 is used to provide an interface mechanism between an operator and the image reader. In various embodiments, the user interface module 134 comprises a keypad, function specific or programmable buttons, a joy or toggle switch and the like. As indicated above, if the display module 132 includes a touch-pad screen overlay, the display module can incorporate some of the input functionality alternatively provided by elements in the user interface module 134.

In some embodiments, the RFID module 136 is an ISO/IEC 14443 compliant RFID interrogator and reader that can interrogate a RFID contactless device and that can recover the response that a RFID tag emits. The International Organization for Standardization (ISO) and the International Electrotechnical Commission (IEC) are bodies that define the specialized system for worldwide standardization. In other embodiments, the RFID module 136 operates in accordance with ISO/IEC 10536, or ISO/IEC 15963. Contactless Card Standards promulgated by ISO/IEC cover a variety of types as embodied in ISO/IEC 10536 (Close coupled cards), ISO/IEC 14443 (Proximity cards), and ISO/IEC 15693 (Vicinity cards). These are intended for operation when very near, nearby and at a longer distance from associated coupling devices, respectively. In some embodiments, the RFID module 136 is configured to read tags that comprise information recorded in accordance with the Electronic Product Code (EPC), a code format proposed by the Auto-ID Center at MIT. In some embodiments, the RFID module 136 operates according to a proprietary protocol. In some embodiments, the RFID module 136 communicates at least a portion of the information received from an interrogated RFID tag to a computer processor that uses the information to access or retrieve data stored on a server accessible via the Internet. In some embodiments, the information is a serial number of the RFID tag or of the object associated with the RFID tag.

In some embodiments, the smart card module 140 is a ISO/IEC 7816 compliant smart card reader with electrical contact for establishing communication with a suitably designed contact chip based smart card. The smart card module 140 is able to read and in some cases write data to attached smart cards.

In some embodiments, the magnetic stripe card module 144 is a magnetic stripe reader capable of reading objects such as cards carrying information encoded in magnetic format on one or more tracks, for example, the tracks used on credit cards. In other embodiments, the magnetic stripe card module 144 is a magnetic character reading device, for reading characters printed using magnetic ink, such as is found on bank checks to indicate an American Bankers Association routing number, an account number, a check sequence number, and a draft amount. In some embodiments, both types of magnetic reading devices are provided.

In some embodiments of the image reader 14, the functionality of the RFID module 136, the smart card module 140, and the magnetic stripe card module 144 are combined in a single tribrid reader module such as the Panasonic's Integrated Smart Card Reader model number ZU-9A36CF4 available from the Matsushita Electrical Industrial Company, Ltd.

Figure 10:
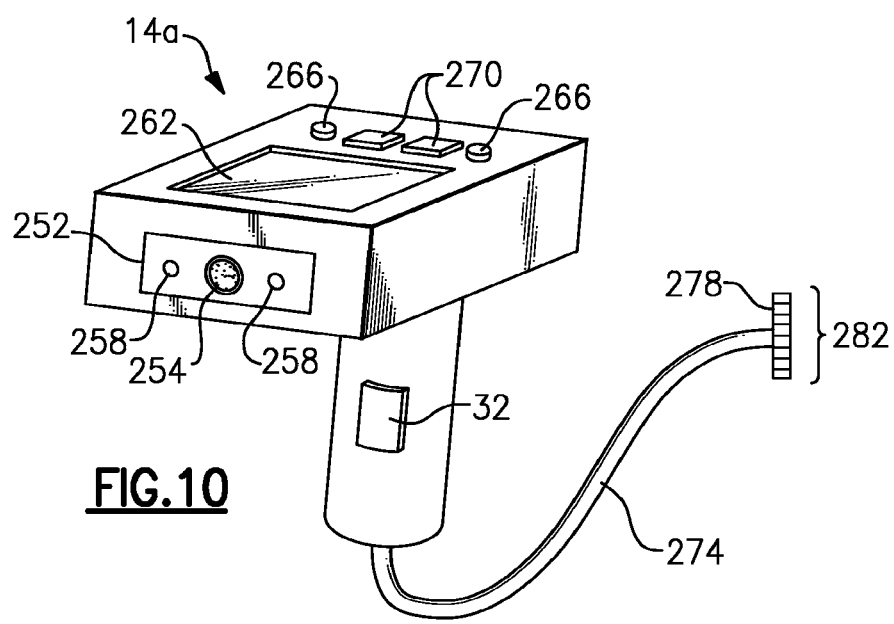
FIG. 10 is perspective drawing of a hand-held image reader constructed according to the principles of the invention.

One example of an image reader 14 constructed in accordance with the invention is shown in the perspective drawing of the hand-held image reader 14a of FIG. 10. The hand-held image reader 14a includes an imager 252 having a lens 254 and a plurality of light sources 258, a display 262, interface indicators 266, interface buttons 270, and a trigger 32. In the embodiment shown, the hand-held image reader 14a also includes a cable 274 attached to a plug 278 including a plurality of pins 282 for establishing electrical communication with a computing device. In various embodiments, the hand-held image reader 14a can be any of the IMAGETEAM™ linear or area image readers such as the models 3800, 3870 and 4410 available from Hand Held Products, Inc. constructed in accordance with the invention.

Figure 11A:
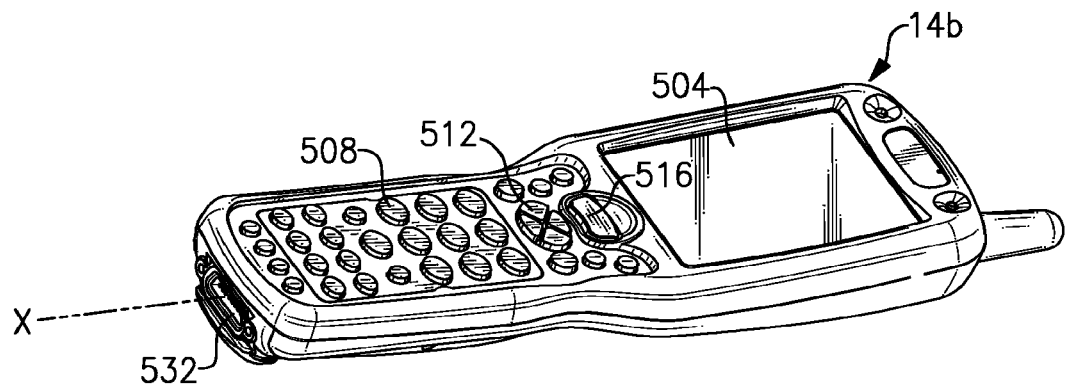
FIGS. 11A-11D show perspective drawings of a portable data terminal embodiment of an image reader constructed in accordance with the principles of the invention.
Figure 11B:
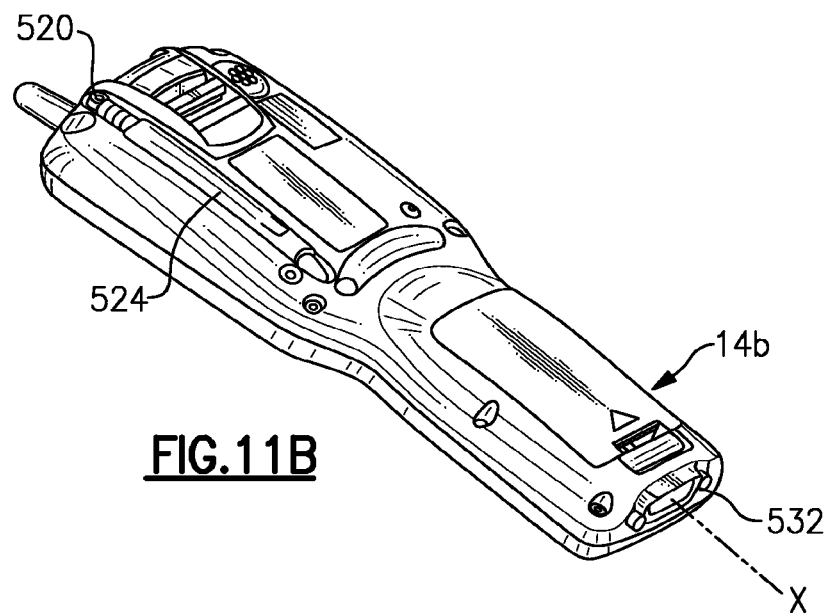
Figure 11C:
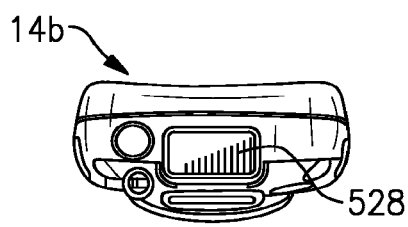
Figure 11D:
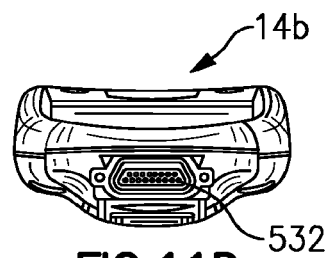

Another example of an image reader 14 constructed in accordance with the principles of the invention is the portable data terminal 14b shown in different perspective drawings in FIGS. 11A-11D. FIG. 11A shows a top perspective, FIG. 11B shows a bottom perspective, FIG. 11C shows a front perspective view, and FIG. 11D shows a back perspective view. As shown, the portable data terminal 14b in one embodiment includes interface elements including a display 504, a keyboard 508, interface buttons 512 for example for positioning a cursor, an actuator 516, and a stylus 520 with a stylus holder 524. The portable data terminal 14b further includes an imager 528. In additional embodiments the portable data terminal can have its functionality enhanced with the addition of multiple detachable computer peripherals. In various embodiments, the computer peripherals can include one or more of a magnetic stripe reader, a biometric reader such as a finger print scanner, a printer such as a receipt printer, a RFID tag or RF payment reader, a smart card reader, and the like.

The portable data terminal 14b further includes an electro-mechanical interface 532 such as a dial-up or cable modem interface, a USB interface, a PCMCIA interface, an Ethernet interface, a RS232 interface, an IBM Tailgate Interface RS485 interface, a CompactFlash interface, a PC Card Standard interface, a Secure Digital standard for memory interface, a Secure Digital Input Output for input/output devices interface and/or any other appropriate standard or proprietary device interface. In various embodiments the electro-mechanical interface 532 can be used as part of attaching computer peripherals.

Figure 12:
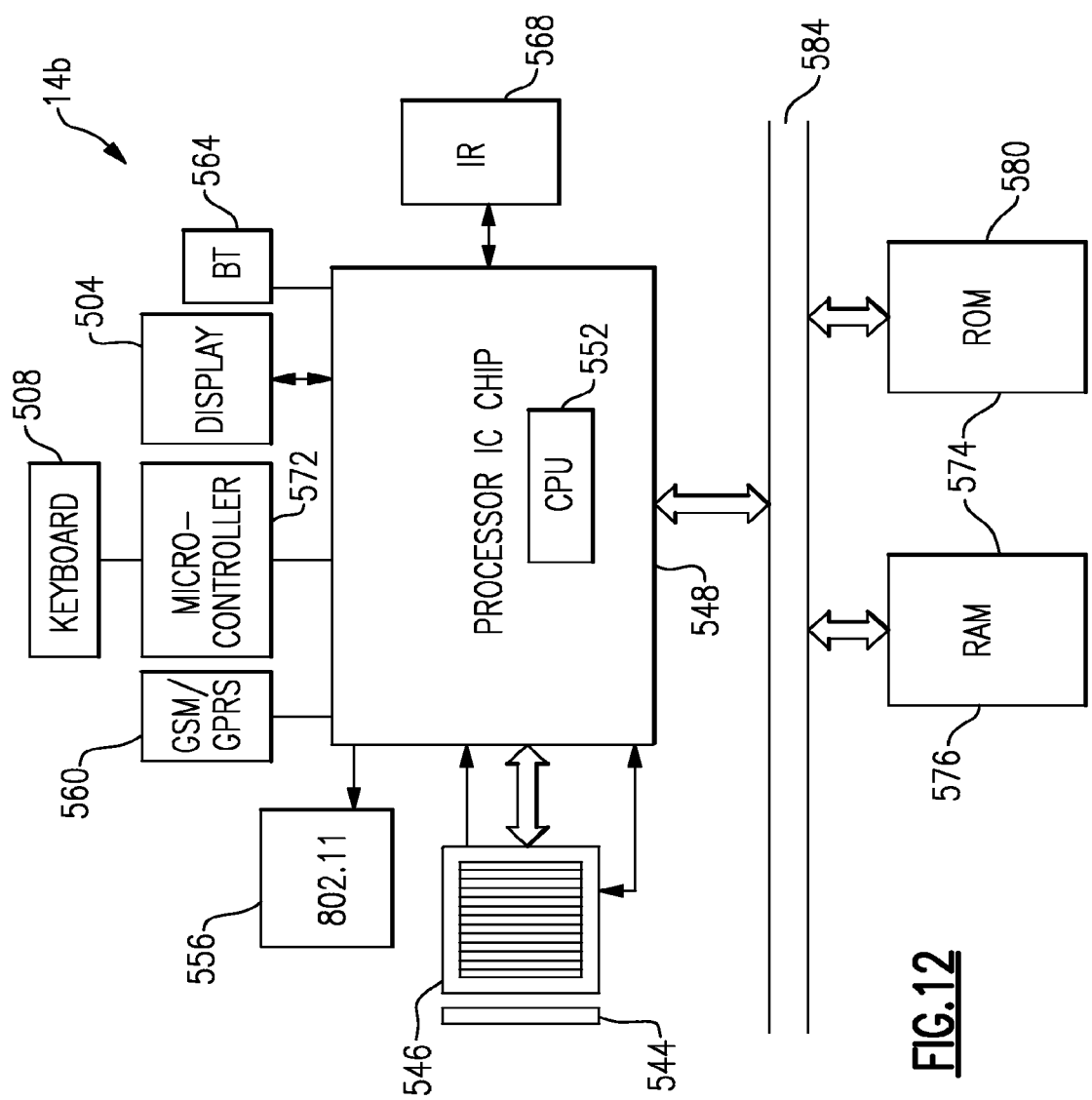
FIG. 12 shows an electrical block diagram of one embodiment of the portable data terminal of FIGS. 11A-11D.

An electrical block diagram of one embodiment of the portable data terminal 14b is shown in FIG. 12. In the embodiment of FIG. 12, the imager 528 includes an image engine including two-dimensional image sensor 536 provided on image sensor chip 546 and associated imaging optics 544. Image sensor chip 546 may be provided in an IT4000 or IT4200 image engine of the type available from HHP, Inc. of Skaneateles Falls, N.Y. The portable data terminal 14b further includes a processor integrated circuit (IC) chip 548 such as may be provided by, for example, an INTEL Strong ARM RISC processor or an INTEL PXA255 Processor. Processor IC chip 548 includes a central processing unit (CPU) 552. As indicated above, the portable data terminal 14b may include a display 504, such as a liquid crystal display, a keyboard 508, a plurality of communication or radio transceivers such as a 802.11 radio communication link 556, a Global System for Mobile Communications/General Packet Radio Service (GSM/GPRS) radio communication link 560, and/or a blue tooth radio communication link 564. In additional embodiments, the portable data terminal 14b may also have the capacity to transmit information such as voice or data communications via Code Division Multiple Access (CDMA), Cellular Digital Packet Data (CDPD), Mobitex cellular phone and data networks and network components. In other embodiments, the portable data terminal 14b can transmit information using a DataTAC™ network or a wireless dial-up connection.

The portable data terminal 14b may further include an infrared (IR) communication link 568. The keyboard 508 may communicate with IC chip 548 via microcontroller chip 572. The portable data terminal 14b further includes a memory 574 including a volatile memory and a non-volatile memory. The volatile memory in one embodiment is provided in part by a RAM 576. The non-volatile memory may be provided in part by flash ROM 580. Processor IC chip 548 is in communication with the RAM 576 and ROM 580 via a system bus 584. Processor IC chip 548 and microcontroller chip 572 also include areas of volatile and non-volatile memory. In various embodiments where at least some of the modules discussed above, such as the autodiscrimination module 120, are implemented at least in part in software, the software components can be stored in the non-volatile memories such as the ROM 580. In one embodiment, the processor IC chip 548 includes a control circuit that itself employs the CPU 552 and memory 574. Non-volatile areas of the memory 574 can be used, for example, to store program operating instructions.

In various embodiments, the processor IC chip 548 may include a number of I/O interfaces (not all shown in FIG. 12) including several serial interfaces (e.g., general purpose, Ethernet, blue tooth), and parallel interfaces (e.g., PCMCIA, Compact Flash).

For capturing images, the processor IC chip 548 sends appropriate control and timing signals to image sensor chip 546. The processor IC chip 548 further manages the transfer of image data generated by the chip 546 into the RAM 576. In one embodiment, the processor IC chip 548 processes frames of image data to, for example, decode a bar code or a set of OCR characters, to perform a texture analysis, and/or to perform a classification of the processing data generated by, for example, the generalized classifier module 216. Various bar code and OCR decoding algorithms are commercially available, such as by the incorporation of an IT4250 image engine with decoder board, available from HHP, Inc. In one embodiment, the decoder board decodes symbologies such as Maxi-Code, PDF417, MicroPDF417, Aztec, Aztec Mesa, Data Matrix, QR Code, Code 49, UCC Composite, Snowflake, Vericode, Dataglyphs, Code 128, Codabar, UPC/EAN, Interleaved 2 of 5, RSS, BC 412, Code 93, Codablock, Postnet (US), BPO4 State, Canadian 4 State, Japanese Post, KIX (Dutch Post), Planet Code, OCR A, OCR B, and the like.

Among other operations, the infrared transceiver 568 facilitates infrared copying of data from a portable data terminal 14b in a broadcasting mode to a portable data terminal 14b in a receiving mode. Utilization of infrared transceiver 568 during a data copying session allows data broadcast from a single broadcast device to be simultaneously received by several receiving devices without any of the receiving devices being physically connected to the broadcasting device. In an additional further embodiment, the image reader 14 can be contained in a transaction terminal.

Figure 13A:
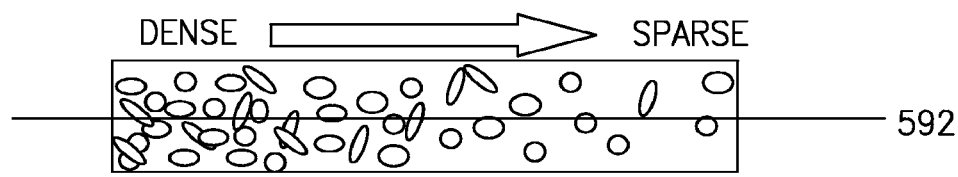
FIG. 13A is a progressive random pattern constructed in accordance with one embodiment of the invention for use in capturing a signature.

Referring to FIGS. 13A-13C and 14 an additional system and method for capturing signatures are presented. The system and method are based on the use of a progressive random pattern, alternatively called a progressive diffused pattern, to locate a signature image area. FIG. 13A provides an example of one embodiment of a progressive random pattern. As shown the progressive random pattern is characterized by a random element pattern that shifts from dense to sparse. The elements in the pattern can be of any shape so long as they maintain a predetermined minimum resolution such as 15 or 20 mils. For any random scan across the progressive random pattern, the progressive random pattern is mathematically defined by the following. A first predefined number N1 of transitions establishes a window width W. Along a scan line, such as the horizontal line 592 shown in FIG. 13A, a transition is encountered when the binarized pixel values change from black (i.e., pixel value 0) to white (i.e., pixel value 1) or vice versa. The width W is the distance from the first to the last of the N1 transitions. In one embodiment, the following relationship for the number of transitions N2 encountered in the second width W must be satisfied:

$$N1=R1(N2)=R1*N2+/-10\%$$

This relationship states that the number of transitions N2 located in the second width W of the scan line multiplied by the factor R2 must equal the first number of transitions N1 to within a margin of error of plus or minus ten percent. For a longer and more precisely defined progressive random pattern, the number of transitions in each successive width W is defined with relationship to the preceding number and an additional numeric factor. For example for the third width W in the scan line, the number N3 of transitions encountered multiplied by the factor R2 is equal to the number of transitions N2 to within a margin of plus or minus ten percent. This is summarized by:

$$N2=R2(N3)=R2*N3+/-10\%$$

In one embodiment, the numeric factors R1, R2, R3, etc. are defined as integers. Therefore, as long as R1 does not equal R2, the direction of the scan line can be determined. This in turn allows the image reader 14 to determine whether the signature is above or below the progressive random pattern (i.e., whether the image data is inverted or not).

Figure 13B:
FIG. 13B is a progressive random pattern with a signature constructed in accordance with one embodiment of the invention.
Figure 13C:
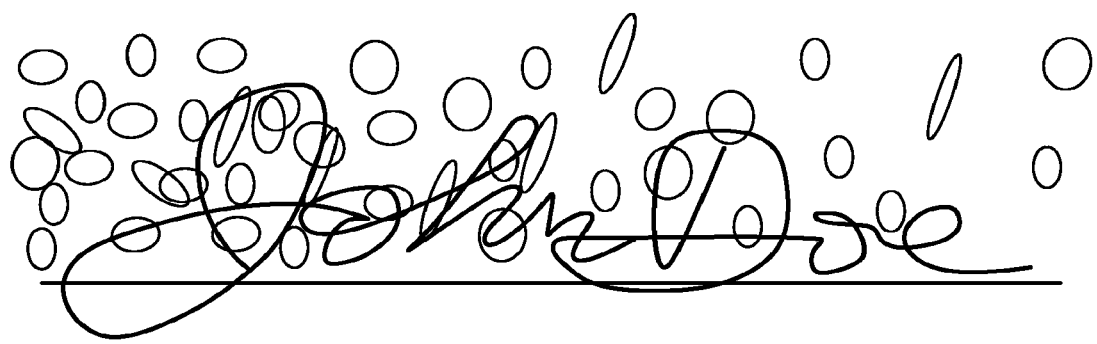
FIG. 13C is a progressive random pattern with a signature constructed in accordance with another embodiment of the invention.

Referring to FIGS. 13B and 13C two embodiments for placing a signature in relation to the progressive random patterns are shown. In FIG. 13B the signature is displaced slightly vertically above the progressive random pattern. In FIG. 13C the signature is written on top of the progressive random pattern. FIG. 13C demonstrates that the progressive random pattern scheme for capturing a signature is robust to defects, distortions or additions introduced into the progressive random pattern. Placing the signature on top of the progressive random pattern has the consumer privacy advantage that the signed material can not be photocopied without detection. In addition, the progressive random pattern approach has the advantage that the pattern is generally more ascetically pleasing to a human user than placing a barcode in proximity to the signature. In addition as the signature can be placed immediately adjacent to the or even on top of the progressive random pattern, the progressive random pattern scheme allows a human operator of an imager reader to intuitively aim the image reader 14 at the signature to capture the signature. As the identification of a progressive random pattern is not necessarily adversely affected by the presence of stray signature marks, a progressive random pattern in some embodiments can be placed closer to a signature line than could a barcode. With many barcodes, stray marks adversely affect the ability of an image reader to properly read and decode the barcode, and, therefore, a barcode used to identify the location of a signature must typically be placed far enough from the signature line so that there is not a significant risk of stray signature marks tainting the barcode.

Figure 14:
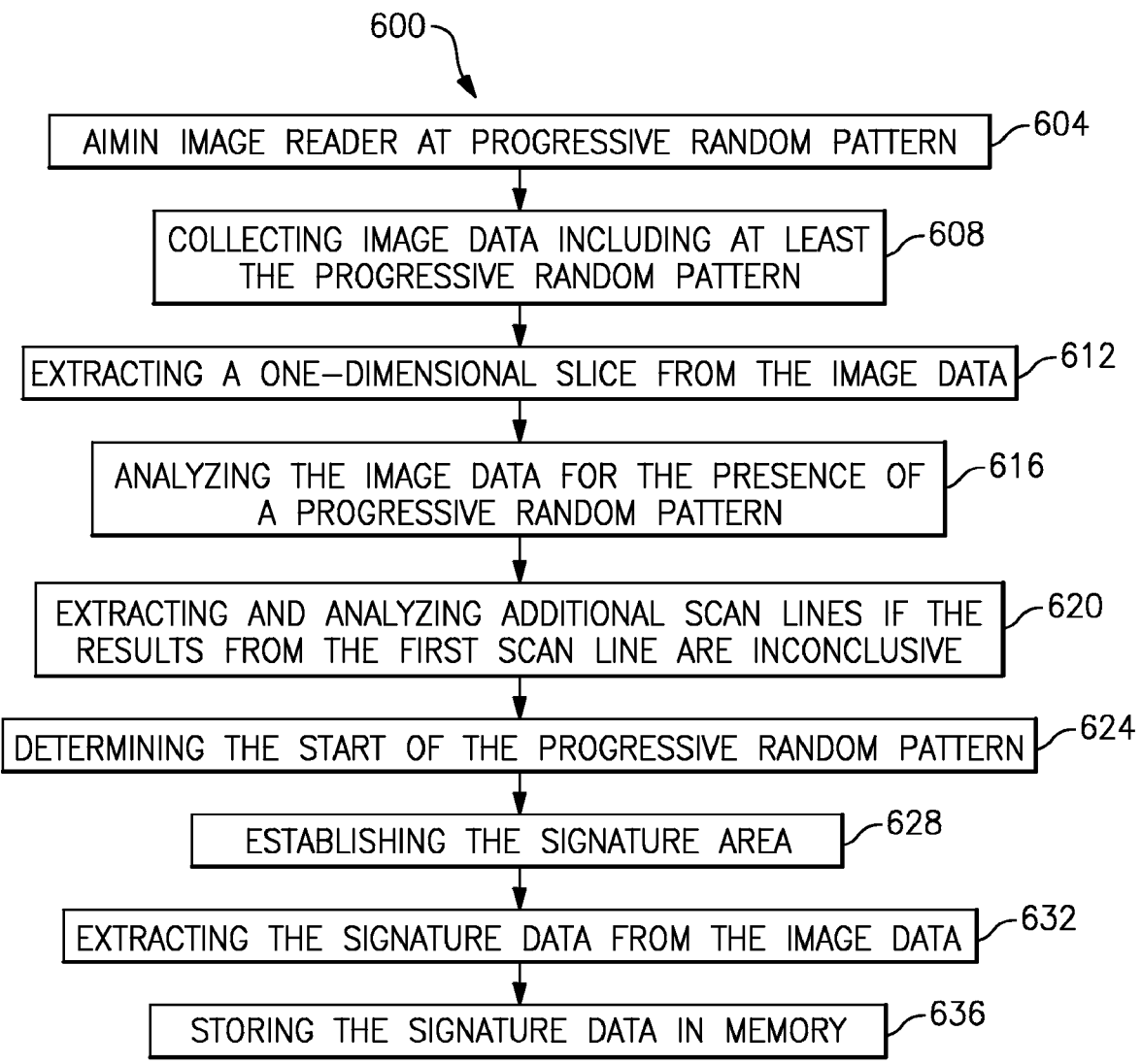
FIG. 14 shows a process for capturing a signature using a progressive random pattern in accordance with one embodiment of the invention.

FIG. 14 presents a process 600 for capturing a signature with a progressive random pattern scheme. To initiate signature capture, a human operator aims (step 604) an image reader 14 at the progressive random pattern and collects (step 608) image data including at least the progressive random pattern and the signature. The image reader 14 extracts (step 612) a one-dimensional slice of the image data. The image reader 14 then analyzes (step 616) the image data slice for the presence of a progressive random pattern. Candidates for the start of the progressive random pattern are identified as regions of transition data subsequent to a region of blank data of a specified length, such as a quiet zone. The analysis includes determining whether the scan line data matches the mathematical criteria established for a progressive random pattern discussed above. As indicated above this can include verifying the relationship between N1 and N2 and possible N2 and N3 and further transition numbers. If the results of the analysis for a single scan line of data are inconclusive, one or more additional scan lines can be extracted and analyzed (step 620). Once the existence of a progressive random pattern is confirmed, the location of the start of the progressive random pattern is determined (step 624) by locating the start of the first window containing the N1 transitions. The signature data area is then established (step 628) by applying vertical and horizontal offsets to the first window start location. In one embodiment if the image data already collected includes the signature data area, then the signature data area is extracted (step 632) from the image data, possibly compressed (step 634) and stored (step 636) in memory. In another embodiment, if the signature data area is not included in the original image or if the original image was of a low resolution, an addition image is collected that includes the signature data area and/or that is of a higher resolution.

In various embodiments, the modules discussed above including the processor module 104, the memory module 108, the I/O module 112, the image collection module 116, autodiscrimination module 120, the actuation module 124, the user feedback module 128 the user interface module 134, the RFID module 136, the smart card module 140, the magnetic stripe module 144, the dataform decode module 204 the image processing and analysis module 208 the feature extraction module 212, the generalized classifier module 216, the signature data processing module 218, the OCR decode module 222, the graphics analysis module, the binarizer module 226, the line thinning module 228, and the convolution module 230 can be implemented in different combination of software, firmware, and/or hardware.

As used herein the term image reader is used to generally cover image collection devices that can perform various functions such as image collection, image analysis, image processing, and/or image data decoding.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein. This application incorporates by reference U.S. Patent Publication No. 2006/0071081.

In one aspect the invention features a method for automatically discriminating between a dataform and a signature. The method comprises collecting image data from an object with an image reader; analyzing the image data to automatically discriminate between a dataform and a signature; and outputting the processed image data. In various embodiments of the method, outputting the processed image data comprises producing decoded barcode data and/or capturing a signature. In one embodiment of the method, analyzing the image data to automatically discriminate between a barcode and a signature comprises attempting to decode the image data as dataform data; and testing the image data for characteristics indicative of a signature, if the attempt to decode the image data as dataform data fails. In an additional embodiment, analyzing the image data and outputting processed image data comprise attempting to decode the image data as dataform data, testing the image data for characteristics indicative of a signature, outputting decoded dataform data if the attempt to decode the image data as dataform data is successful, and outputting signature data if the test for characteristics indicative of a signature is successful. In another embodiment of the method, the attempt to decode the image data as bar code data comprises an attempt to decode the image data as a one dimensional bar code. In a further such embodiment, the one dimensional bar code is a UPC bar code. In an additional embodiment of the method, testing the image data for characteristics indicative of a signature includes at least testing the image data for the presence of curved elements.

In another aspect, the invention features a method for automatically discriminating between a barcode and a signature. The method comprises aiming a hand-held image reader at an object including a target; actuating a trigger on the hand-held image reader; collecting image data including at least the target; analyzing the image data to automatically discriminate between a barcode and a signature; and outputting processed image data. In various embodiments of the method, outputting processed image data comprises producing decoded barcode data and/or capturing a signature. In one embodiment of the method, analyzing the image data to automatically discriminate between a barcode and a signature comprises attempting to decode the image data as dataform data and testing the image data for characteristics indicative of a signature, if the attempt to decode the image data as dataform data fails. In an additional embodiment analyzing the image data and outputting processed image data comprise attempting to decode the image data as dataform data, testing the image data for characteristics indicative of a signature, outputting decoded dataform data if the attempt to decode the image data as dataform data is successful, and outputting signature data if the test for characteristics indicative of a signature is successful. In another embodiment of the method, the attempt to decode the image data as bar code data comprises an attempt to decode the image data as a one dimensional bar code. In a further such embodiment, the one dimensional bar code is a UPC bar code. In an additional embodiment of the method, testing the image data for characteristics indicative of a signature includes at least testing the image data for the presence of curved elements.

In another aspect, the invention features an image reader that automatically discriminates between a barcode and a signature. The image reader comprises an image collection module configured to collect image data representative of a target and an autodiscrimination module in communication with the image collection module. The autodiscrimination module is configured to automatically discriminate between a signature and a dataform. The image reader also comprises an I/O module in communication with at least the autodiscrimination module. In one embodiment, the autodiscrimination module comprises a dataform decoder module and an image processing and analysis module that is configured to perform a texture analysis of the image data and that is configured to classify the image data in response to the texture analysis. In an additional embodiment, the texture analysis includes testing the image data for characteristics indicative of a signature. In a further embodiment, testing the image data for characteristics indicative of a signature includes at least testing the image data for the presence of curved elements. In yet another embodiment, the image processing and analysis module is configured to respond to a failure of the dataform decoder to decode the image data. In yet an additional embodiment, the dataform decoder module is configured to execute a one dimensional barcode decoding algorithm. In a related embodiment, the one dimensional barcode decoding algorithm is configured to decode at least UPC barcodes. In yet a further embodiment, the image reader also comprises a housing configured to be hand held and oriented by a human operator and a trigger configured to be actuated to initiate the operation of the autodiscrimination module and the image collection module. The housing encloses the autodiscrimination module, the image collection module, and the output module. In still another embodiment, the image reader further comprises a housing to be attached to a surface. The housing encloses the autodiscrimination module, the image collection module, and the output module. When attached to the surface, the housing is designed to orient the image collection module towards objects containing targets to be imaged by the image collection module. In various embodiments, the image collection module and the output module are implemented in a combination of hardware and software.

In another aspect, the invention features a method for automatically capturing a signature on a signature bearing item. The method comprises collecting image data from an object with an image collecting device, the image data representing a signature or a barcode. The method also comprises analyzing the image data to determine whether the image data represents a signature and capturing the signature contained in the signature image data if the analysis of the image data indicates that the signature is present in the image data.

In another aspect the invention features a method for automatically capturing a signature on a signature bearing item. The method comprises capturing a first image with an image reader, the first image including a representation of a dataform; decoding and processing the dataform; and capturing a second image, the second image including a representation of a signature. The capturing of the second image is performed in response to at least the decoding and processing of the dataform. In one embodiment, capturing the first image occurs in response to a first actuation of a trigger on the image reader and capturing the second image occurs in response to at least a second actuation of the trigger.

In another aspect the invention features, an image reader that captures an image of a dataform and a signature. The image reader comprises an image collection module configured to collect image data representative of a target, the image data including representations of a dataform and a signature; a dataform decode module in communication with the image collection module, the dataform decode module configured to decode the dataform in the image data; and a signature data processing module, the signature data processing module in communication with the image collection module. The signature data processing module configured to store a copy of the image data including the dataform and the signature.

In another aspect, the invention features an image reader that captures an image of a dataform and a signature. The image reader comprises an image collection module configured to collect image data representative of a target, the image data including representations of a dataform and a signature; a dataform decode module in communication with the image collection module, the dataform decode module configured to decode the dataform in the image data; and an image processing and analysis module in communication with the image collection module. The image processing and analysis module configured to determine the location of the signature in the image data by at least analyzing the image data for characteristics indicative of a signature. In one embodiment, the determination of the location of the signature in the image data includes analyzing a plurality of regions of the image data for characteristics indicative of a signature. In another embodiment, the image processing and analysis module comprises an image modification module that generates modified image data in which a portion of the image data not including the signature has been deleted.

In another aspect, the invention features a method for automatically discriminating between a plurality of data types. The method comprises collecting image data from an object with an image collecting device; analyzing the image data to automatically discriminate between at least a first data type and a second data type, the second data type being different from the first data type; and processing the image data. In this embodiment, the first data type and the second data type are selected from the group consisting of: signatures; dataforms; handwritten text; typed text; machine readable text; OCR data; pictures; images; shipping manifests; finger prints; and biometrics. In yet another embodiment, the biometric data comprises a facial image scan. In yet an additional embodiment, processing the image data comprises producing decoded barcode data. In yet a further embodiment, processing the image data comprises capturing a signature. In still another embodiment, analyzing the image data to automatically discriminate between at least a first data type and a second data type comprises attempting to decode the image data as dataform data and testing the image data for characteristics indicative of a signature, if the attempt to decode the image data as dataform data fails. In still a further embodiment, the attempt to decode the image data as bar code data comprises an attempt to decode the image data as a one dimensional bar code. In an additional such embodiment, the one dimensional bar code is a UPC bar code. In another embodiment, testing the image data for characteristics indicative of a signature includes at least testing the image data for the presence of curved elements.

In another aspect, the invention features a method for automatically identifying a signature. The method comprises collecting image data from an object with an image collecting device; analyzing the image data to automatically determine whether a signature is contained in the image data; outputting a first response if the signature is present in the image data; and outputting a second response if the signature is absent from the image data.

While the present invention has been explained with reference to the structure disclosed herein, it is not confined to the details set forth and this invention is intended to cover any modifications and changes as may come within the scope and spirit of the following claims.

I claim:

1. An image reader that automatically discriminates between data types, the image reader comprising:
   an image collection module configured to collect image data representative of a target;
   an autodiscrimination module in communication with the image collection module, the autodiscrimination module configured to automatically discriminate between a facial image biometric and a dataform; and
   an I/O module in communication with at least the autodiscrimination module.

2. The image reader according to claim 1, wherein said autodiscrimination module comprises:
   a dataform decoder module; and
   an image processing and analysis module configured to perform a texture analysis of the image data and configured to classify the image data in response to the texture analysis.

3. The image reader according to claim 2, wherein the autodiscrimination module is configured to automatically discriminate between a signature and a dataform, and wherein the texture analysis includes testing the image data for characteristics indicative of a signature.

4. The image reader according to claim 3, wherein testing the image data for characteristics indicative of a signature includes at least testing the image data for the presence of curved elements.

5. The image reader according to claim 1, further comprising:
   a housing configured to be hand held and oriented by a human operator, the housing enclosing the autodiscrimination module, the image collection module, and the I/O module; and
   a trigger configured to be actuated to initiate the operation of the autodiscrimination module and the image collection module.

6. The image reader according to claim 1, wherein the autodiscrimination module is configured to automatically discriminate between a signature and a dataform.

7. The image reader according to claim 1, wherein the autodiscrimination module includes a generalized classifier module that employs a neural network and receives data from the feature extraction module.

8. The image reader according to claim 1, wherein the image data is image data of a first collected image, wherein the image reader is configured for identifying a bar code dataform in the first collected image and for examining image data representing a signature to identify a signature in the first collected image, the first collected image collected using the image collection module, the image reader further configured to attempt to decode the barcode dataform by processing image data of the first collected image and to output decoded barcode dataform data determined from the attempt to decode.

9. The image reader according to claim 1, wherein the image data is image data of a first collected image, wherein the image reader segments the first collected image into a plurality of regions, wherein the image reader for each region of the plurality of regions is configured to classify content of the region as a dataform if the region includes a dataform, and as a signature if the region includes a signature.

10. The image reader according to claim 1, wherein the image data is image data of a first collected image, wherein the image reader subjects image data of a first collected image to a decode attempt using a dataform decode module, the first collected image collected using the image collection module, wherein the image reader is configured so that responsive to decoding of the dataform by subjecting of the image data of a first collected image to a decode attempt the dataform decode module is disabled in a manner that for a subsequent image collected using the image collection module, the dataform decode module is not active to process image data for attempting to decode a dataform.

11. An image reader that automatically identifies different data types, the image reader comprising:
an image collection module configured to collect image data representative of a target;
wherein the image reader is configured for identifying a bar code dataform in a first collected image and for examining image data representing a signature to identify a signature in the first collected image, the first collected image collected using the image collection module, the image reader further configured to attempt to decode the barcode dataform by processing image data of the first collected image and to output decoded barcode dataform data determined from the attempt to decode.

12. The image reader of claim 11, wherein the image reader is hand held.

13. The image reader of claim 11, wherein the image reader is configured for storing into a memory signature image data responsive to the image reader identifying the signature.

14. The image reader of claim 13, wherein for performing of the storing the image reader stores the first collected image without cropping of image data external to the signature image data.

15. The image reader of claim 13, wherein for performing of the storing the image reader compresses the first collected image.

16. The image reader of claim 11, wherein the image reader is configured for generating a modified image by cropping image data external to the signature responsive to the image reader identifying the signature.

17. The image reader of claim 11, wherein the examining image data includes applying curvelet detector maps.

18. The image reader of claim 11, wherein the image reader segments the first collected image into a plurality of regions, wherein the image reader for each region of the plurality of regions is configured to classify content of the region as a dataform if the region includes a dataform, and as a signature if the region includes a signature.

19. A image reader that automatically identifies different data types, the image reader comprising:
an image collection module configured to collect image data representative of a target;
wherein the image reader segments a first collected image into a plurality of regions, wherein the image reader for each region of the plurality of regions is configured to classify content of the region as a dataform if the region includes a dataform, and as a signature if the region includes a signature, the first collected image collected using the image collection module.

20. The image reader of claim 19, wherein the image reader is hand held.

21. A image reader comprising:
an image collection module configured to collect image data representative of a target;
a dataform decode module;
wherein the image reader subjects image data of a first collected image to a decode attempt using the dataform decode module, the first collected image collected using the image collection module, wherein the image reader is configured so that responsive to decoding of the dataform by subjecting of the image data of a first collected image to a decode attempt the dataform decode module is disabled in a manner that for a subsequent image collected using the image collection module, the dataform decode module is not active to process image data for attempting to decode a dataform.

22. The image reader of claim 21, wherein the image reader includes a classifier that classifies image data of a collected image by data type, wherein further in response to the decoding of the dataform the classifier is disabled in a manner that for the subsequent image, the classifier is not active to classify image data by data type.

* * * * *